United States Patent
Dudar

(10) Patent No.: US 11,326,529 B1
(45) Date of Patent: May 10, 2022

(54) METHODS AND SYSTEMS FOR MITIGATING WATER INGESTION IN VARIABLE DISPLACEMENT ENGINE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/303,214

(22) Filed: May 24, 2021

(51) Int. Cl.
*F02D 17/02* (2006.01)
*F02D 29/02* (2006.01)

(52) U.S. Cl.
CPC .......... *F02D 17/02* (2013.01); *F02D 29/02* (2013.01); *F02D 2200/70* (2013.01)

(58) Field of Classification Search
CPC ....... F02D 17/02; F02D 29/02; F02D 2200/70
See application file for complete search history.

(56) References Cited

U.S. PATENT DOCUMENTS

| | | | | |
|---|---|---|---|---|
| 4,768,494 A * | 9/1988 | Hale | ........................ | F02B 25/26 123/198 F |
| 5,645,032 A * | 7/1997 | Motose | ..................... | F02D 9/02 123/339.16 |
| 5,720,257 A * | 2/1998 | Motose | .................. | F02D 17/02 123/339.14 |
| 9,938,913 B2 | 4/2018 | Dudar | | |
| 10,100,770 B2 * | 10/2018 | Dudar | ..................... | F02D 35/02 |
| 10,337,426 B2 * | 7/2019 | Dudar | .................. | F02D 41/065 |
| 10,493,993 B2 | 12/2019 | Dudar et al. | | |
| 2002/0083916 A1 * | 7/2002 | Maurer | ................ | F02M 35/161 123/198 E |
| 2012/0181802 A1 * | 7/2012 | Atkinson | ............... | B60K 11/08 293/112 |
| 2013/0104832 A1 * | 5/2013 | Chang | .............. | F02M 35/10013 123/184.21 |
| 2014/0085066 A1 * | 3/2014 | Tran | ...................... | G01S 15/931 340/425.5 |
| 2014/0352659 A1 * | 12/2014 | Glugla | ................ | F02D 41/2406 123/350 |
| 2015/0046071 A1 * | 2/2015 | Clarke | ................ | G01F 23/2965 701/112 |
| 2017/0212974 A1 * | 7/2017 | Khapane | .................. | G06F 30/23 |
| 2018/0215381 A1 * | 8/2018 | Owen | ................. | B60W 30/143 |
| 2019/0360406 A1 * | 11/2019 | Moorcroft | ........ | F02M 35/10393 |
| 2021/0229589 A1 * | 7/2021 | Wright, III | ............ | B60P 3/1075 |
| 2021/0237741 A1 * | 8/2021 | Sharp | ....................... | G01C 9/00 |
| 2021/0237756 A1 * | 8/2021 | Thompson | ............ | B60W 50/14 |

FOREIGN PATENT DOCUMENTS

GB       2486577 A       6/2021

* cited by examiner

*Primary Examiner* — Carl C Staubach
(74) *Attorney, Agent, or Firm* — Geoffrey Brumbaugh; McCoy Russell LLP

(57) ABSTRACT

Methods and systems are provided for mitigating water ingestion in a variable displacement engine. In one example, a method for a vehicle may comprise: with an engine of the vehicle turned on, responsive to detection of a water wading condition through which the vehicle is passing, operating the engine in a variable displacement engine (VDE) mode with a reduced number of cylinders of the engine activated and any cylinders in excess of the reduced number of cylinders deactivated. In this way, water ingestion into the cylinders of the engine and the resulting combustion instability may be avoided during the water wading conditions.

20 Claims, 9 Drawing Sheets

METHODS AND SYSTEMS FOR MITIGATING WATER INGESTION IN VARIABLE DISPLACEMENT ENGINE

FIELD

The present description relates generally to methods and systems for reducing water ingestion/accumulation in a variable displacement engine of a vehicle.

BACKGROUND/SUMMARY

Land-based vehicles may often travel through water. Some vehicles may be equipped with special high mount air intake systems that may allow them to travel through a specified depth of water without causing water damage to vehicle compartments and vehicle electronics. However, encountering a level of water beyond a maximum wading depth may pose a risk of water ingestion into combustion cylinders. In situations of a vehicle wading through high water, engine may experience misfires and may stall as the ingested water disrupts the air fuel ratio. If a lot of water enters the cylinders, hydrolock can occur as liquid water is incompressible, thereby causing significant damage to the engine.

One approach for reducing water accumulation in an engine is described in U.S. Patent Application Publication No. 10337426. Therein, methods and systems are provided for reducing accumulation of condensate in an engine intake during an engine non-combusting condition. Therein, in response to a higher than threshold ambient humidity, intake and exhaust valves of deactivatable cylinders are closed in order to seal the cylinders, and during an immediately subsequent engine combusting condition, the intake and exhaust valves of the deactivatable cylinders may be activated and combustion may be resumed.

However, the inventors herein have recognized potential issues with the above approach. As one example, the approach may not be able to address water accumulation in one or more engine cylinders during conditions when an engine is running or combusting as the vehicle drives through a level of water. Additionally, the above approach may not be able to mitigate misfire and/or hydrolock events associated with water wading conditions.

In one example, the issues described above may be addressed by a method for a vehicle comprising: with an engine of the vehicle turned on, responsive to detection of a water wading condition through which the vehicle is passing, operating the engine in a variable displacement engine (VDE) mode with a reduced number of cylinders of the engine activated and any cylinders in excess of the reduced number of cylinders deactivated. In this way, water ingestion into the cylinders of the engine and the resulting combustion instability may be avoided during the water wading conditions.

As another example, the issues described above may be addressed by a method for controlling an engine of a vehicle, comprising: while the engine is on and responsive to detection of a water wading condition through which the vehicle begins to pass, deactivating a maximum number of cylinders of the engine, where the maximum number is a highest number of cylinders deactivated while maintaining remaining cylinders active to maintain power; monitoring the power contributed by each active cylinder of the engine while the vehicle is passing through the water wading condition; and responsive to identification of a misfire event in one or more active cylinders of the engine based on monitoring of the power, disabling the one or more active cylinders that are misfiring and simultaneously reactivating one or more deactivated cylinders of the engine. In this way, by strategically employing VDE controls during the water wading conditions the engine may be protected from possible misfire and/or hydrolock events caused due to water ingestion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
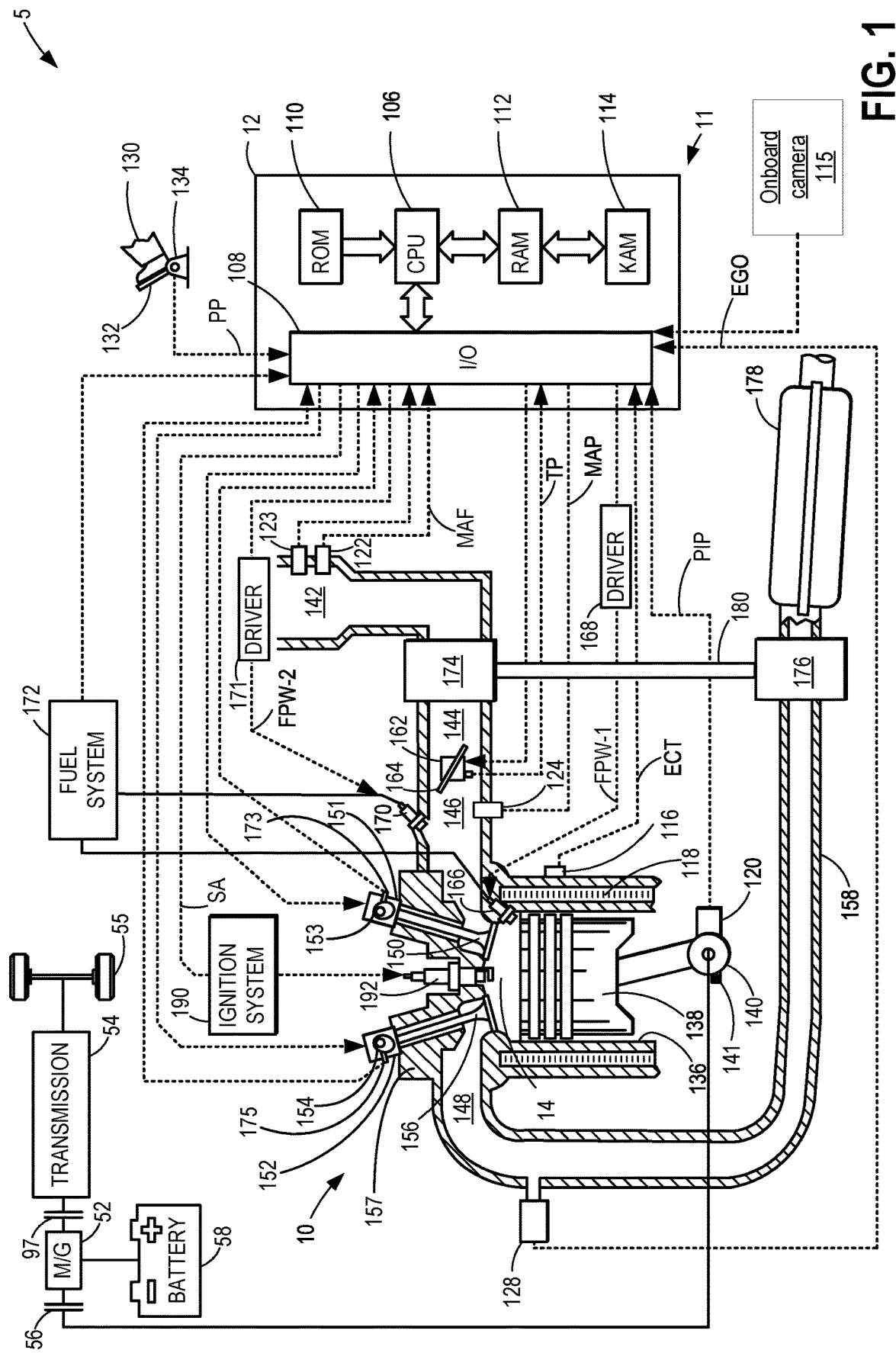
FIG. 1 schematically shows a variable displacement engine (VDE) including a combustion chamber having intake valves and/or exhaust valves driven via camshaft.

The following description relates to methods and systems for mitigating water ingestion in a variable displacement engine. FIG. 1 depicts an example of a combustion chamber or cylinder of an internal combustion engine of a vehicle. The internal combustion engine may be a VDE, such as the VDE depicted in the system of FIG. 2. The system of FIG. 2 may include an individual cylinder deactivation mechanism for activating and/or deactivating one or more cylinders of the engine and a variable cam timing (VCT) mechanism for adjusting a position of a camshaft of the engine. A controller of the vehicle may activate and/or deactivate one or more cylinders of the VDE in various configurations of activated and deactivated cylinders. FIG. 3A shows a first example configuration of activated and deactivated cylinders of a V8 engine, where all cylinders of the VDE are activated. FIG. 3B shows a second example configuration of activated and deactivated cylinders where all the cylinders of a first engine bank of the VDE are activated and all the cylinders of a second engine bank of the VDE are not activated. FIG. 3C shows a third example configuration of activated and deactivated cylinders, where a portion of the cylinders of the first engine bank are activated and a portion of the cylinders of the second engine bank of the VDE are deactivated. FIG. 3D shows a fourth example configuration of activated and deactivated cylinders, where a single cylinder of the VDE is activated.

Figure 4:
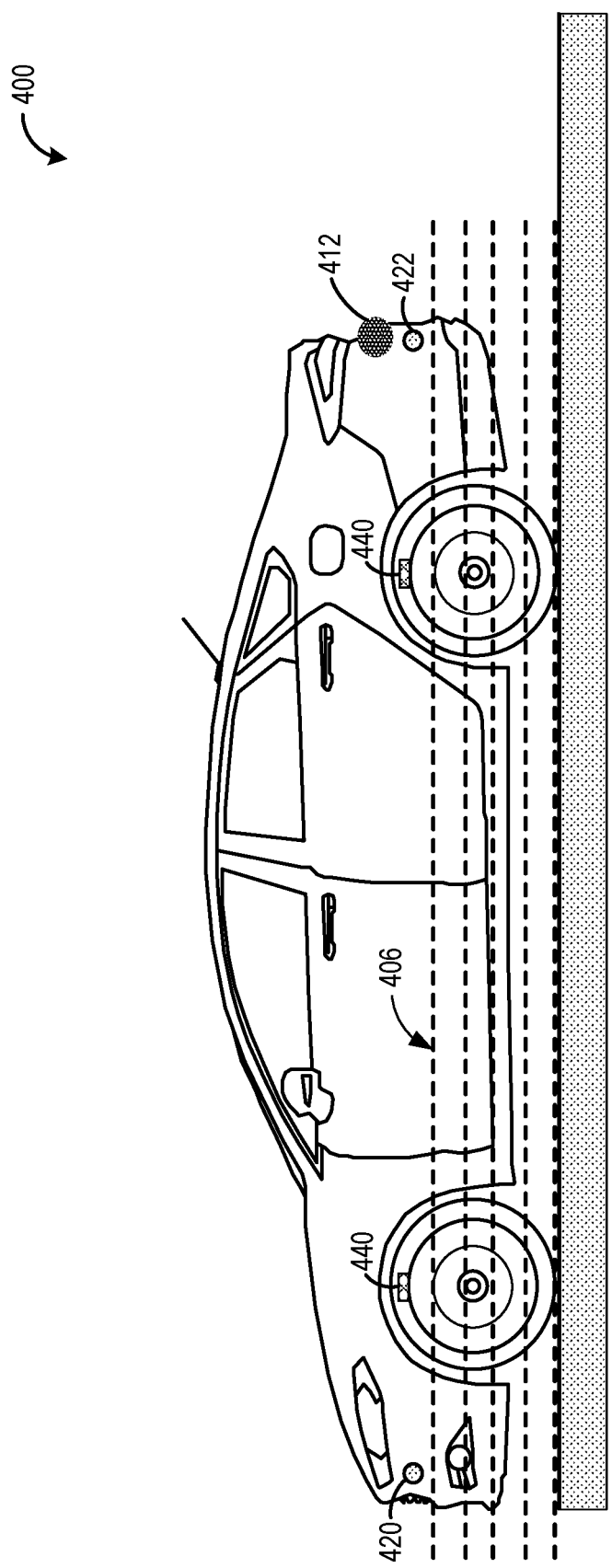
FIG. 4 shows entry conditions for employing VDE controls and VCT mechanism during water wading conditions.
Figure 5:
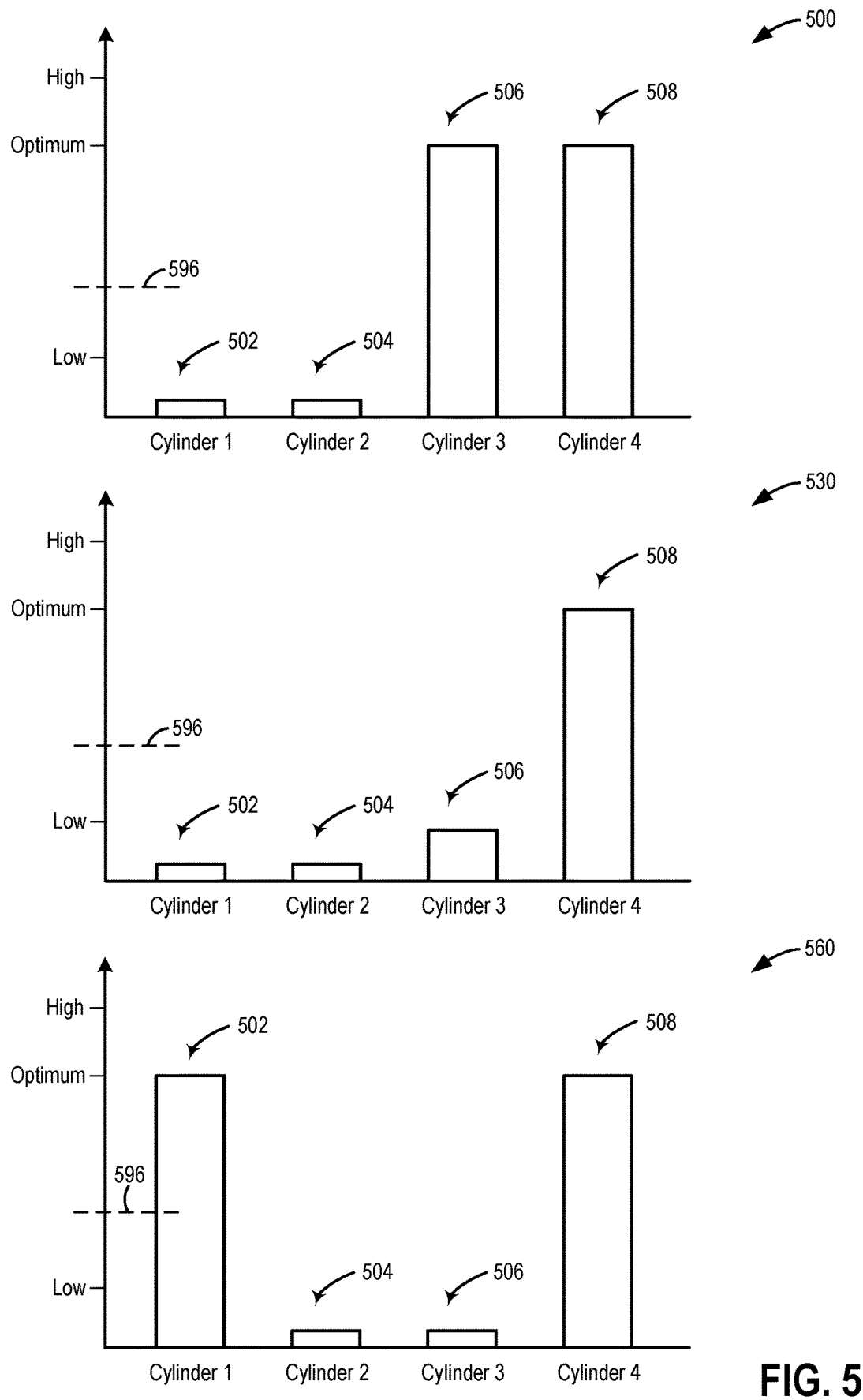
FIG. 5 shows example plots of cylinder power diagnosing a possible misfire scenario while driving through water wading conditions.
Figure 6:
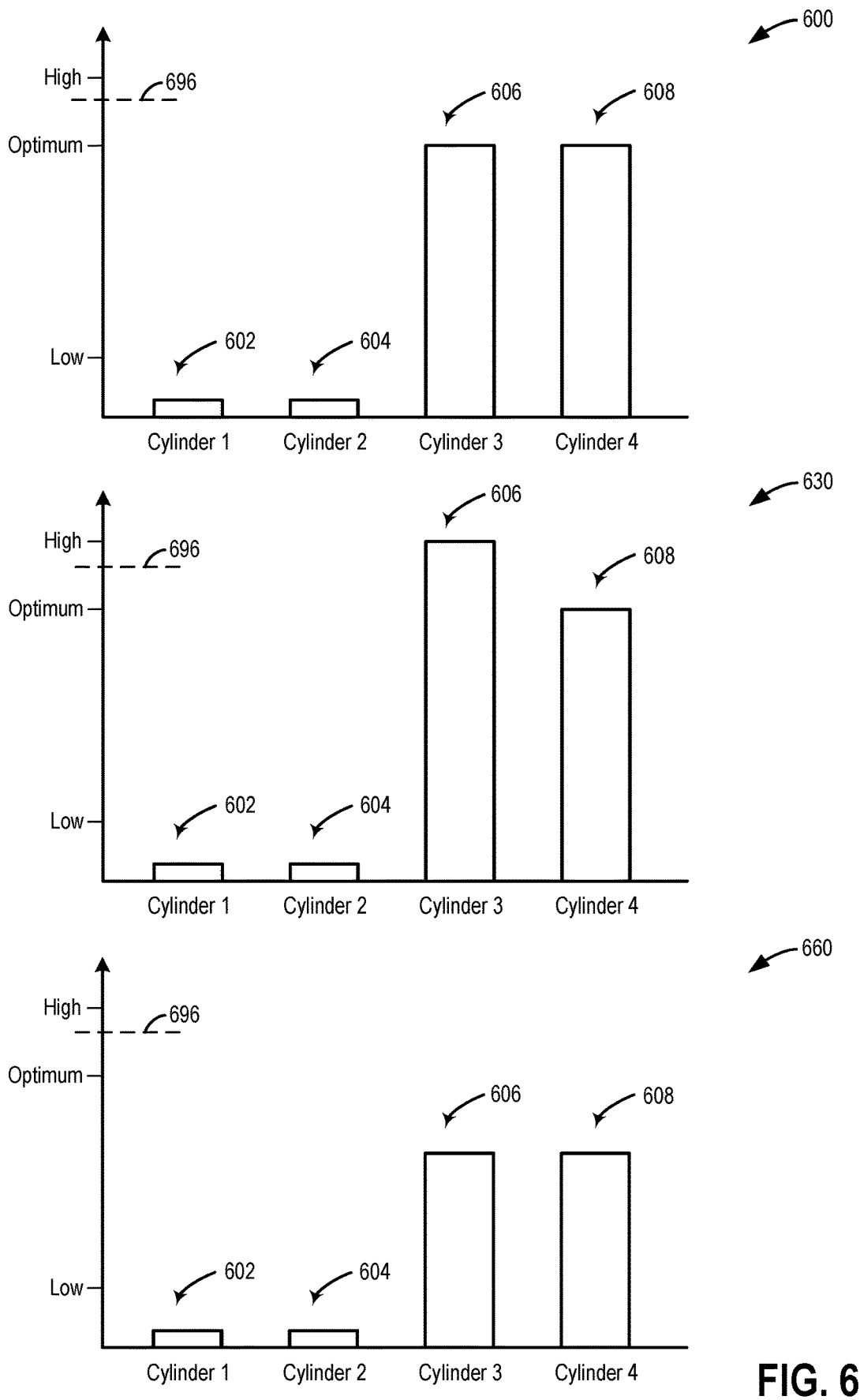
FIG. 6 shows example plots of cylinder power diagnosing a possible hydrolock scenario while driving through water wading conditions.

Entry conditions for employing VDE controls and VCT mechanism during water wading conditions is shown in FIG. 4. Additionally, FIG. 4 depicts the onboard sensors for detecting the water wading conditions. Various example plots depicting power contributed by each cylinder of the VDE are indicated in FIGS. 5 and 6. Using a power balance test, possible misfire and/or hydrolock events occurring in one or more cylinders of the engine are identified during the water wading conditions. An example method for mitigating a possible misfire scenario due to water ingestion while driving through the water wading conditions is described in FIG. 7. The controller may deactivate a number of cylinders of the VDE while maintaining remaining cylinders activated as the vehicle begins to drive through the water wading conditions. When a misfire event is identified in an active cylinder, the method deactivates the misfiring cylinder and simultaneously reactivates a previously deactivated dry cylinder while driving through the water wading conditions. An example method for mitigating a possible hydrolock scenario due to water ingestion while driving through the water wading conditions is described in FIG. 8, where the VCT system is adjusted to a late intake valve closure strategy to mitigate the hydrolock event. Further, FIG. 9 provides a graphical display of an exemplary engine operating sequence to illustrate VDE controls and VCT mechanism in greater detail. For the purposes of this disclosure, when describing a variable displacement engine, the terms "engine" and "VDE" may be used interchangeably to refer to the variable displacement engine.

Referring to FIG. 1, an example of a combustion chamber or cylinder of internal combustion engine 10 is shown. Engine 10 may be controlled at least partially by a control system 11 including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. The cylinder 14 is capped by cylinder head 157. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10. Additionally, a crankshaft position sensor 141 may be coupled to the crankshaft 140 to estimate engine speed.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174. Additionally, the intake passage 142 may include an ambient humidity sensor 123. The ambient humidity sensor 123 may be configured to estimate the ambient humidity for engine operations and provide a signal to the controller 12.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state exhaust gas oxygen sensor or EGO (as depicted), a HEGO (heated EGO), a NOx, HC, or CO sensor, for example. Emission control device 178 may include a three-way catalytic converter, where a three way catalyst (TWC) is used to oxidize exhaust gas pollutants, NOx trap, or other similar emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

In the example of FIG. 1, intake valve 150 and exhaust valve 156 are actuated (e.g., opened and closed) via respective cam actuation systems 153 and 154. Cam actuation systems 153 and 154 each include one or more cams mounted on one or more camshafts and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 173 and 175, respectively. In alternate embodiments, one or more additional intake valves and/or exhaust valves of cylinder 14 may be controlled via electric valve actuation. For example, cylinder 14 may include one or more additional intake valves controlled via electric valve actuation and one or more additional exhaust valves controlled via electric valve actuation, as will be described in more detail in FIG. 2. It should be appreciated that the actuation systems described herein are for illustrative purposes, and in other examples, the internal combustion engine 10 may include one or more different cam actuation systems.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 housed within cylinder head 157 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 172. As elaborated with reference to FIG. 2, fuel system 172 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 172 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 172, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics, such as differences in size. For example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 172 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches are engaged. In the depicted example, a first clutch 56 is provided between crankshaft 140 and electric machine 52, and a second clutch 97 is provided between electric machine 52 and transmission 54. Controller 12 may send a signal to an actuator of each clutch (e.g., first clutch 56 and/or second clutch 97) to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, FIG. 1 shows only one cylinder of multi-cylinder engine 10. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Engine 10 is a variable displacement engine, and cylinder 14 may be one of a plurality of deactivatable or non-deactivatable cylinders of the engine 10. For example, one or more valves of the cylinder 14 (e.g., intake valve 150 and/or exhaust valve 156) may be adjustable by the controller 12 from an activated mode to a deactivated mode (and vice versa). For example, cylinder 14 may be a deactivatable cylinder, with the intake valve 150 and exhaust valve 156 each being coupled to respective deactivatable valve assemblies. The deactivatable valve assemblies may be deactivatable via a suitable type of deactivation device, such as via lash adjustment, rocker arm deactivation, roller lifter deactivation, camshaft-type deactivation, etc. In some examples the deactivatable valve assemblies may adjust an operational mode of their corresponding coupled valves in response to signals transmitted to the deactivatable valve assemblies by the controller 12. Intake valve 150 is shown coupled to deactivatable valve assembly 151 and exhaust valve 156 is shown coupled to deactivatable valve assembly 152.

In one example, the controller 12 may transmit electrical signals to the deactivatable valve assembly 151 in order to adjust the operational mode of the intake valve 150 from an activated mode to a deactivated mode (or vice versa) and/or the controller 12 may transmit electrical signals to the deactivatable valve assembly 152 in order to adjust the operational mode of the exhaust valve 156 from an activated mode to a deactivated mode (or vice versa).

Although operation of the cylinder 14 is adjusted via the deactivatable valve assemblies 151 and 152 as described above, in some examples, operation of one or more cylinders of the engine 10 may not be adjusted by deactivatable valve assemblies. For example, the engine 10 may include four cylinders (e.g., cylinder 14), with operation of a first pair of the cylinders being adjustable via deactivatable valve assemblies and operation of a second pair of cylinders not being adjustable via deactivatable valve assemblies.

The controller 12 receives signals from the various sensors of FIG. 1 and employs the various actuators of FIG. 1 to adjust engine operation based on the received signals and instructions stored on a memory of the controller. In one example, in response to a higher than threshold ambient humidity condition as estimated via the inputs from the humidity sensor 123, during an engine-on condition, the controller 12 may send a signal to the cam actuation systems 153 and 154 to selectively close the intake valve 150 and the exhaust valve 156 of a deactivatable cylinder. For example, adjusting the intake valve 150 from the activated mode to the deactivated mode may include adjusting an actuator of the intake valve 150 (e.g., deactivatable valve assembly 151) to adjust an amount of movement of the intake valve 150 relative to cylinder 14. For example, the controller 12 may transmit electrical signals to a hydraulic fluid valve of the deactivatable valve assembly 151 (with the deactivatable valve assembly 151 coupled to the intake valve 150) in order to move the hydraulic fluid valve of the deactivatable valve assembly 151 from an opened position to the closed position. Similarly, the controller 12 may transmit electrical signals to the hydraulic fluid valve of the deactivatable valve assembly 151 in order to move the hydraulic fluid valve to an opened position and thereby adjust the intake valve 150 to the activated mode under some conditions.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; engine speed from crankshaft position sensor 141 coupled to crankshaft 140; throttle position (TP) from a throttle position sensor; and absolute manifold pressure signal (MAP) from sensor 124. Engine speed signal, RPM, may be generated by controller 12 from signal PIP and/or crankshaft position sensor 141 movement. Manifold pressure signal MAP from a manifold pressure sensor may be used to provide an indication of vacuum, or pressure, in the intake manifold. Controller 12 may infer an engine temperature based on an engine coolant temperature.

Controller 12 may also receive image data from an onboard camera 115 of the vehicle. Image data received from the onboard camera 115 may be used by the controller to estimate a condition of a road or a weather condition, and/or to detect an obstacle in a path of the vehicle when the vehicle is in a reverse gear of the engine 10. In one example, image data received from the onboard camera 115 is used to input data into the controller 12. For example, the image data received from the onboard camera 115 may include details of flooded condition of the road. The controller may receive the image data of the road condition. In one example, based on the image data of the road condition, the controller may activate or deactivate one or more cylinders of the engine 10 as described above to prevent engine water ingestion and adjust an amount of power generated by the engine 10, as described in further detail below in relation to FIGS. 4-6.

Figure 2:
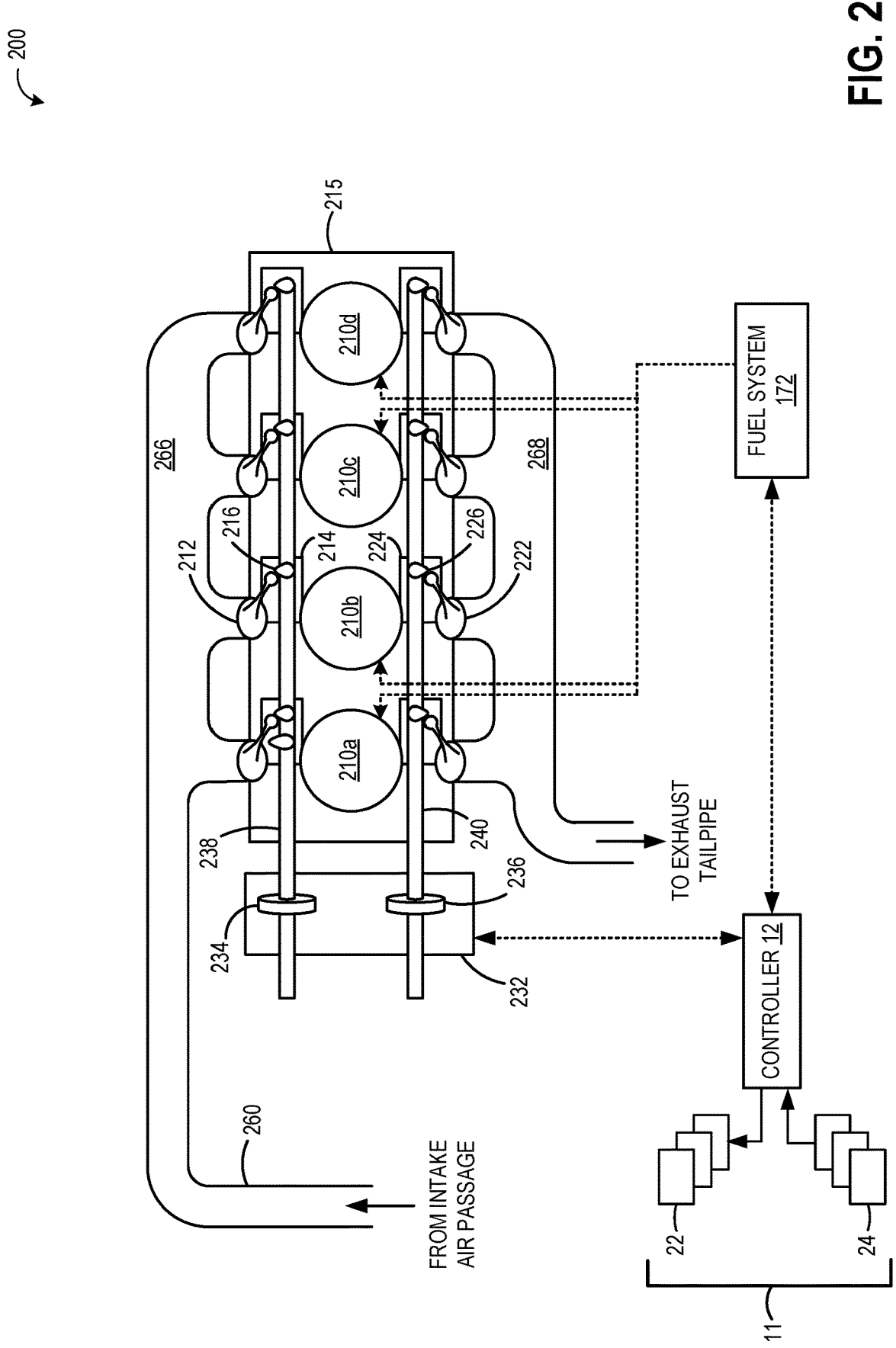
FIG. 2 shows an example embodiment of the variable displacement engine of FIG. 1 configured with an individual cylinder deactivation mechanism and a variable cam timing (VCT) mechanism for adjusting a position of a camshaft of the engine.
Figures 3A, 3B, 3C, 3D:
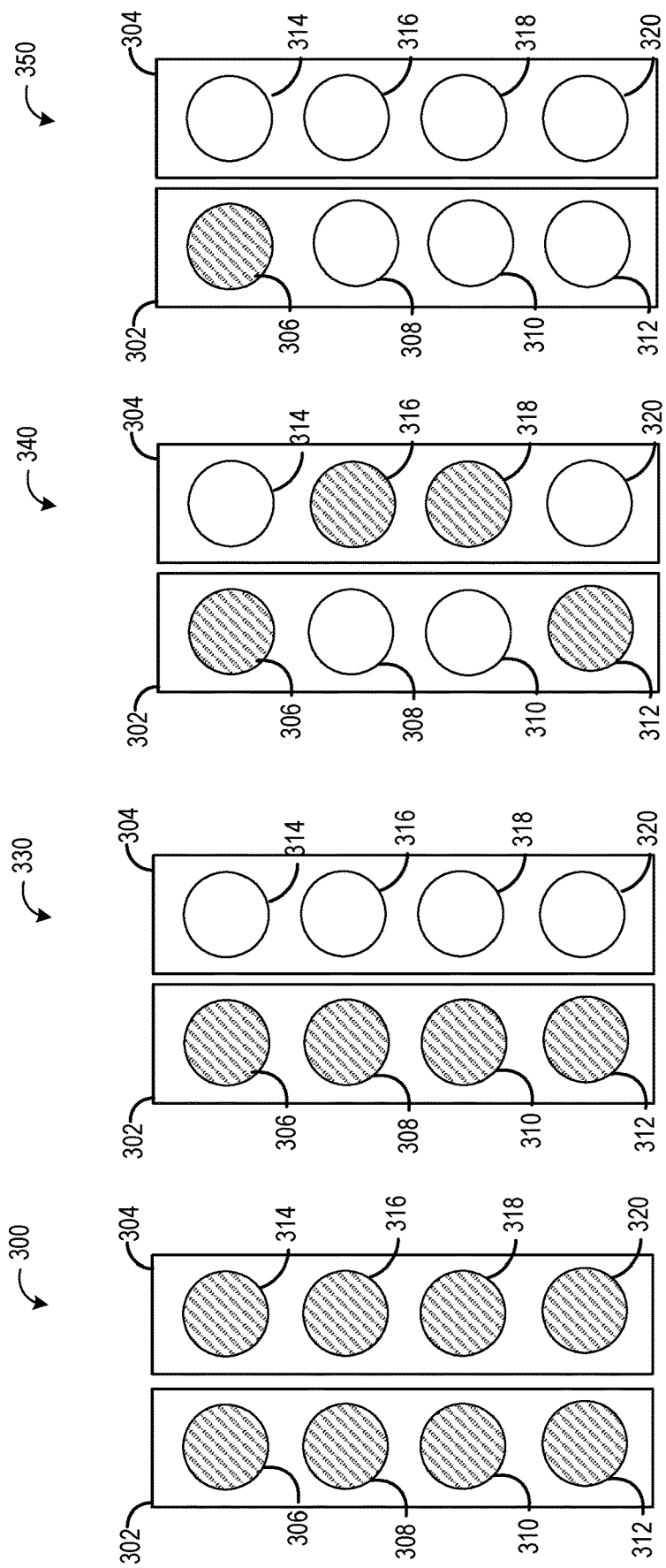
FIG. 3A shows cylinders of a variable displacement engine in a first example configuration of activated and deactivated cylinders.
FIG. 3B shows cylinders of a variable displacement engine in a second example configuration of activated and deactivated cylinders.
FIG. 3C shows cylinders of a variable displacement engine in a third example configuration of activated and deactivated cylinders.
FIG. 3D shows cylinders of a variable displacement engine in a fourth example configuration of activated and deactivated cylinders.

FIG. 2 shows an example embodiment of an engine 200 including controller 12, a variable cam timing (VCT) system 232, and an engine block 215 with a plurality of cylinders 210. Engine 200 may be a non-limiting example of engine 10 described in FIG. 1. Thus, FIG. 2 shows an example VCT system which may be employed in the engine 10 described in FIG. 1, to adjust the timing of the opening and closing of the intake valve 150 and exhaust valve 156 of engine 10. Engine 200 is shown having an intake manifold 266 configured to supply intake air and/or fuel to the cylinders 210 a-d and an exhaust manifold 268 configured to exhaust the combustion products from the cylinders 210. Ambient air flow can enter the intake system through intake air passage 260, wherein the flow rate and/or pressure of the intake air can be controlled at least in part by a main throttle (not shown).

Engine block 215 includes a plurality of cylinders 210 a-d (herein four). In the depicted example, all the cylinders are on a common engine bank. In alternate embodiments, the cylinders may be divided between a plurality of banks. For example, cylinders 210 a-b may be on a first bank while cylinder 210 c-d may be on a second bank. Cylinders 210 a-d may each include a spark plug and a fuel injector for delivering fuel directly to the combustion chamber, as described above in FIG. 1. Also, cylinders 210 a-d may each be serviced by one or more valves. In the present example, each cylinder 210 a-d includes a corresponding intake valve 212 and an exhaust valve 222. As elaborated below, engine 200 further includes one or more camshafts 238, 240 wherein each camshaft can be actuated to operate intake and/or exhaust valves of a plurality of cylinders coupled to a common camshaft.

Each intake valve 212 is actuatable between an open position that allows intake air into the corresponding cylinder and a closed position substantially blocking intake air from the cylinder. Further, FIG. 2 shows how intake valves 212 of cylinders 210 a-d may be actuated by a common intake camshaft 238. Intake camshaft 238 may be included in intake valve actuation system 214. Intake camshaft 238 includes intake cam lobes 216 which have a lift profile for opening the intake valves 212 for a defined intake duration. In some embodiments (not shown), the camshaft may include additional intake cam lobes with an alternate lift profile that allows the intake valves 212 to be opened for an alternate lift and/or duration (herein also referred to as a cam profile switching system). Based on the lift profile of the additional cam lobe, the alternate duration may be longer or shorter than the defined intake duration of intake cam lobe 216. The lift profile may affect cam lift height, cam duration, opening timing, and/or closing timing. Controller 12 may be able to switch the intake valve duration by moving the intake cam lobes 216 longitudinally and switching between cam profiles. In another embodiment, the controller 12 may be able to switch the intake valve duration by latching or unlatching rocker arms, cam followers, or other mechanisms between cam lobes 216 and intake valves 212.

In the same manner, each exhaust valve 222 is actuatable between an open position allowing exhaust gas out of the corresponding cylinder and a closed position substantially retaining gas within the cylinder. Further, FIG. 2 shows how exhaust valves 222 of cylinders 210 a-d may be actuated by a common exhaust camshaft 240. Exhaust camshaft 240 may be included in exhaust valve actuation system 224. Exhaust camshaft 240 includes exhaust cam lobes 226 which have a lift profile for opening the exhaust valves 222 for a defined exhaust duration. In some embodiments (not shown), the camshaft may include additional exhaust cam lobes with an alternate lift profile that allows the exhaust valves 222 to be opened for an alternate lift and/or duration. Based on the lift profile of the additional cam lobe, the alternate duration may be longer or shorter than the defined exhaust duration of exhaust cam lobe 226. The lift profile may affect cam lift height, cam duration, opening timing, and/or closing timing. Controller 12 may be able to switch the exhaust valve duration by moving the exhaust cam lobes 226 longitudinally and switching between cam profiles. In another embodiment, the controller 12 may be able to switch the exhaust valve duration by latching or unlatching rocker arms, cam followers, or other mechanisms between cam lobes 226 and exhaust valves 222.

It will be appreciated that while the depicted example shows common intake camshaft 238 coupled to the intake valves of each cylinder 210 a-d, and common exhaust camshaft 240 coupled to the exhaust valves of each cylinder 201 a-d, in alternate embodiments, the camshafts may be coupled to cylinder subsets, and multiple intake and/or exhaust camshafts may be present. For example, a first intake camshaft may be coupled to the intake valves of a first subset of cylinders (e.g., coupled to cylinders 210 a-b) while a second intake camshaft may be coupled to the intake valves of a second subset of cylinders (e.g., coupled to cylinders 210 c-d). Likewise, a first exhaust camshaft may be coupled to the exhaust valves of a first subset of cylinders (e.g., coupled to cylinders 210 a-b) while a second exhaust camshaft may be coupled to the exhaust valves of a second subset of cylinders (e.g., coupled to cylinders 210 c-d). Further still, one or more intake valves and exhaust valves may be coupled to each camshaft. The subset of cylinders coupled to the camshaft may be based on their position along the engine block 215, their firing order, the engine configuration, etc.

Intake valve actuation system 214 and exhaust valve actuation system 224 may further include push rods, rocker arms, tappets, etc. Such devices and features may control actuation of the intake valves 212 and the exhaust valves 222 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210 a-d may each have more than one exhaust valve and/or intake valve. In still other examples, each of the exhaust valve 222 and intake valve 212 of one or more cylinders may be actuated by a common camshaft. Further still, in some examples, some of the intake valves 212 and/or exhaust valves 222 may be actuated by their own independent camshaft or other device.

Engine 200 may include variable valve timing systems, for example, variable cam timing VCT system 232. VCT system 232 may be a twin independent variable camshaft timing system, for changing intake valve timing and exhaust valve timing independently of each other. VCT system 232 includes intake camshaft phaser 234 coupled to the common intake camshaft 238 for changing intake valve timing and exhaust camshaft phaser 236 coupled to common exhaust camshaft 240 for changing exhaust valve timing. VCT system 232 may be configured to advance or retard valve timing by advancing or retarding cam timing and may be controlled via signal lines by controller 12. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically actuated, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 232.

In the depicted example, since the intake valves of all the cylinders 210 *a-d* are actuated by a common intake camshaft, a change in the position of the intake camshaft 238 will affect the intake valve position and timing of all the cylinders. Likewise, since the exhaust valves of all the cylinders 210 *a-d* are actuated by a common exhaust camshaft, a change in the position of the exhaust camshaft 240 will affect the exhaust valve position and timing of all the cylinders. For example, a change in position of the intake and/or exhaust camshaft that advances the (intake or exhaust) valve timing of a first cylinder 210 *a* will also advance the (intake or exhaust) valve timing of the remaining cylinders 210 *b-d* at the same time. However, adjustment of the valve timing may be performed on one or more cylinders independent of the valve timing of the remaining cylinders.

As described above, FIG. 2 shows a non-limiting example of an internal combustion engine and associated intake and exhaust systems. It should be understood that in some embodiments, the engine may have more or fewer combustion cylinders, control valves, throttles, and compression devices, among others. Example engines may have cylinders arranged in a "V" configuration. Further, a first common camshaft may control the valves for a first set of cylinders on a first bank while a second camshaft may control the valves for a second set of cylinders on a second bank. That is, a common camshaft of a cam actuation system (e.g., a VCT system) may be used to control valve operation of a group of cylinders.

Thus, FIG. 2 illustrates variable valve timing systems that may be used to adjust the intake valve opening, intake valve closing, exhaust valve opening, and exhaust valve closing events of one or more cylinders of an engine.

Engine 200, depicted in FIG. 2, is a variable displacement engine (VDE) and may also be referred to herein as VDE 200. As described previously, in the depicted example, all four cylinders (210 *a-d*) of VDE 200 are located on a common engine bank. In some examples, however, VDE 200 may include two separate engine banks (e.g., a first engine bank and a second engine bank) of cylinders. In some examples, VDE 200 may be a V-8 engine with the first and second banks each having four cylinders. Furthermore, in alternate embodiments, the engine may have a different number of engine cylinders, such as 4, 6, 10, 12, etc, distributed either on a common engine bank or between a plurality of engine banks.

The VDE 200 may be designed to deactivate cylinders en masse, where more than one cylinder may be deactivated at the same time. For example, two cylinders out of the four cylinders of VDE 200 may be deactivated, leaving two cylinders of the VDE 200 combusting fuel and two cylinders operating unfueled. The VDE 200 may also be designed as a rolling VDE system where each cylinder may be turned off individually. For example, a first cylinder of the VDE 200 may be deactivated responsive to a first condition, a second cylinder of the VDE 200 may be deactivated responsive to a second condition, a third cylinder of the VDE 200 may be deactivated responsive to a third condition, and so on. Similarly, the VDE 200 may be designed to activate one or more cylinders, either en masse or individually, during operation of the engine. In one example, the VDE 200 may be switched on in an initial configuration of activated and deactivated cylinders. In other examples, the engine may be operated in an initial configuration of all activated cylinders; however, it may strategically employ the VDE controls to deactivate some cylinders in response to a particular condition, e.g., while driving through water wading conditions.

During a selected condition, such as when the vehicle is being driven through water wading conditions, one or more cylinders of the VDE 200 may be deactivated (herein also referred to as a VDE mode of operation). For example, upon the selected condition being met, the cylinder 210*a* of the VDE 200 may be deactivated, and/or the cylinder 210*b* of the VDE 200 may be deactivated, and/or the cylinder 210*c* of the VDE 200 may be deactivated. Additionally, one of a first or a second cylinder group may be selected for deactivation. For example, the first cylinder group may comprise the cylinder 210*a* and the cylinder 210*b*, and the second cylinder group may comprise the cylinder 210*c* and the cylinder 210*d*. In examples where engine cylinders are distributed among a plurality of engine banks, the first cylinder group may comprise the cylinders of a first bank, the second cylinder group may comprise the cylinders of a second bank, and so on. Thus, any number of cylinders of the VDE 200 may be activated or deactivated, individually or in groups, in various configurations. Each configuration of the various configurations may generate an engine torque, where the engine torque of one configuration may or may not be the same as the engine torque of a different configuration. By adjusting the configuration of activated and deactivated cylinders, the engine torque may be increased or decreased. Additionally, by adjusting the configuration of activated and deactivated cylinders, the engine may be protected from water damage, while maintaining torque to drive through water wading conditions without getting stalled.

As described above with respect to FIG. 1, each cylinder may include one or more fuel injectors (e.g., fuel injector 166 of FIG. 1) and intake and exhaust valves (e.g., intake valve 150 and exhaust valve 156 of FIG. 1). During VDE mode, cylinders of the selected group of cylinders may be deactivated by shutting off respective fuel injectors and deactivating respective intake and exhaust valves. While fuel injectors of the disabled cylinders are turned off, the remaining enabled cylinders continue to carry out combustion, with corresponding fuel injectors and intake and exhaust valves active and operating. To meet torque requirements, the engine produces the same amount of torque on active cylinders. This may entail higher manifold pressures, resulting in lowered pumping losses and increased engine efficiency. Additionally, a lower effective surface area (from the enabled cylinders and not the disabled cylinders) exposed to combustion reduces engine heat losses, improving the thermal efficiency of the engine.

As detailed with reference to FIGS. 4-6, during an engine combusting condition and while driving through a water wading condition, the ambient humidity may increase above a threshold humidity (e.g., as detected by the ambient humidity sensor 123 of FIG. 1) and surrounding water may be ingested into the intake manifold (e.g., the intake manifold 266) of the VDE. If the engine valves are opened during the combusting condition, water from the intake manifold may even enter within the cylinders. Consequently, water ingested in the cylinders may cause hydrolock, engine misfires, and/or combustion instability. As elaborated herein, the deactivatable cylinder valves/VDE controls and the VCT mechanism may be strategically and effectively used to reduce water accumulation inside the deactivatable cylinders during engine-on conditions, thereby reducing the propensity of hydrolock and misfire occurrences during engine operation through water wading conditions.

In response to a higher than threshold ambient humidity during an engine-on event, e.g. during water wading conditions, each intake valve and exhaust valve coupled to one or more deactivatable engine cylinders may be closed in order to seal the deactivatable cylinders, as the water wading conditions begin. This may reduce the possibility of water ingestion within the deactivated cylinders and the deactivated cylinders may be reserved for future use. The active cylinders may be controlled via a late intake valve closure (LIVC) strategy of the VCT system (e.g., the VCT system 232) to reduce the effective compression ratio in case of cylinder hydrolock during water wading conditions. Additionally or alternatively, if the active cylinders misfire from water ingestion while driving through water, the misfiring cylinder may be deactivated and each intake valve and exhaust valve coupled to the one or more previously deactivated dry cylinders may be reactivated and fueling may be resumed. By resuming combustion in the previously sealed deactivatable cylinders, engine misfire occurrence and combustion instability may be reduced since these are the cylinders where water ingestion was actively reduced by cylinder deactivation in the beginning of water wading conditions. The process of deactivating a misfiring cylinder and reactivating a sealed and dry cylinder may be repeated multiple times until the water wading conditions end. In this way, engine power may be maintained and the vehicle may be able to drive through water wading conditions without the engine stalling.

The VDE 200 may operate on a plurality of substances, which may be delivered to each cylinder via the fuel system 172. Fuel tanks in fuel system 172 may hold fuel with different fuel qualities, such as different fuel compositions. These differences may include different alcohol content, different octane, different heat of vaporizations, different fuel blends, and/or combinations thereof etc. VDE 200 may be controlled at least partially by a control system 11, including controller 12. The controller 12 may receive various signals from sensors 24 coupled to VDE 200 (e.g., MAF sensor 122 of FIG. 1, MAP sensor 124 of FIG. 1, Hall effect sensor 120 of FIG. 1, etc.) and send control signals to various actuators 22 coupled to the engine and/or vehicle (e.g., throttle 162 of FIG. 1, fuel injector 166 of FIG. 1, etc.).

Referring briefly to FIGS. 3A-3D, different example configurations of activated and deactivated cylinders of a variable displacement engine (as described herein, the VDE) are shown (e.g., engine 10 of FIG. 1 and/or engine 200 of FIG. 2). In FIG. 3A, an example cylinder activation configuration 300 includes a first cylinder bank 302 and a second cylinder bank 304. The cylinder banks 302 and 304 each may have four cylinders. Cylinder bank 302 includes a cylinder 306, a cylinder 308, a cylinder 310, and a cylinder 312. Cylinder bank 304 includes a cylinder 314, a cylinder 316, a cylinder 318, and a cylinder 320. In FIG. 3A, activated cylinders are denoted via circles with hatching and deactivated cylinders are denoted via solid circles. In at least one example, the engine cylinders shown may be all of the cylinders of the engine. Further, in the example shown in FIG. 3A, eight cylinders are shown, though other numbers of cylinders are possible. In at least one example, a firing order of the cylinders is maintained. In FIG. 3A, each of the cylinders 306, 308, 310, and 312 of the cylinder bank 302 are activated, and each of the cylinders 314, 316, 318, and 320 of the cylinder bank 304 are activated, whereby all of the cylinders of the engine are activated.

In FIG. 3B, an example cylinder activation configuration 330 is shown where each of the cylinders 306, 308, 310, and 312 of the cylinder bank 302 are activated, and each of the cylinders 314, 316, 318, and 320 of the cylinder bank 304 are not activated, whereby half of the cylinders of the engine (e.g., corresponding to the cylinder bank 302) are fired with fuel to generate a torque of the engine, and half of the cylinders of the engine (e.g., corresponding to the cylinder bank 304) are fired unfueled, and do not generate a torque. When half of the cylinders of the engine are activated, the torque of the engine may be half of a torque generated when all of the cylinders of the engine are activated.

When the cylinders 306, 308, 310, and 312 of the cylinder bank 302 are activated and the cylinders 314, 316, 318, 320 of the cylinder bank 304 are not activated, an imbalance may be generated due to the cylinders 306, 308, 310, and 312 of the cylinder bank 302 firing and the cylinders 314, 316, 318, 320 of the cylinder bank 304 not firing. The imbalance may result in a noise, vibration, and harshness (NVH) of the engine. In some examples, the NVH may be reduced by balancing a firing of one or more cylinders of the cylinder bank 302 with a firing of one or more cylinders of the cylinder bank 304. In FIG. 3C, an example cylinder activation configuration 340 is shown where cylinders 306 and 312 of cylinder bank 302 are activated and cylinders 308 and 310 are deactivated, and where cylinders 316 and 318 of cylinder bank 304 are activated and cylinders 314 and 320 of cylinder bank 304 are not activated. As a result of cylinder bank 302 and cylinder bank 304 each having the same number of activated cylinders, an NVH of the example configuration 340 may be less than the NVH of the example configuration 330.

FIG. 3D shows an example cylinder activation configuration 350 where the cylinder 306 of the cylinder bank 302 is activated, and each of the cylinders 308, 310, and 312 of the cylinder bank 302 are not activated, and where each of the cylinders 314, 316, 318, and 320 of the cylinder bank 304 are not activated. In this example configuration, the torque generated by the engine is the torque generated by the cylinder 306. As a result of the torque generated by the engine being the torque generated by the cylinder 306, an amount of torque generated by the engine may be substantially less than the torque of the engine in the example cylinder activation configurations 340, 330, and 300.

Referring to FIG. 4, it shows a host vehicle 400 including a flood detection system that may detect when the host vehicle 400 is traveling on a flooded road and/or through a water wading condition. The flood detection system may detect the flood based on a change in tire pressure, exhaust gas temperature, images of an area surrounding the host vehicle 400, proximity to the water surface, or a combination thereof. The flood detection system may also be configured to determine a depth of the flood water using sensor data. The flood detection system of the host vehicle 400 may alert the operator of the water wading condition, the flooded road and/or whether the water depth is greater than a predetermined threshold. A controller (e.g., controller 12 of FIGS. 1-2) may then accordingly control specific vehicle operations to prepare and protect the vehicle from water ingestion while maintaining engine power to drive through water wading conditions as will be described in more detail with reference to FIGS. 5-8.

The host vehicle 400 may be a non-limiting example of vehicle 5 described in FIG. 1. In particular, the host vehicle 400 may include a VDE such as the engine 10 of FIG. 1 or VDE 200 of FIG. 2, and a control system such as the control system 11 of FIGS. 1-2. The flood detection system of the host vehicle 400 may be a part of the control system that may include a memory and a processor (e.g., the memory chip 110 and the microprocessor unit 106 of vehicle 5 of FIG. 1). The memory may store instructions executable by the processor, and the control system may receive information from various sensors and may send control signals to various actuators (e.g., the sensors 24 and actuators 22 of vehicle 5 of FIG. 1).

The flood detection system may communicate with components of the host vehicle 400 such as a front camera 420, a rear camera 422, a proximity sensor 412, a tire pressure sensor 440, and an exhaust gas sensor (not shown). These components may be in communication with the flood detection system over a vehicle communication network. The communication network may include hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

In one example, the front camera 420 and the rear camera 422 are vision sensors that may capture images of the ground near the host vehicle 400. To capture such images, the front camera 420 and the rear camera 422 may each include a lens that projects light toward e.g., a CCD image sensor, a CMOS image sensor, etc. The front camera 420 and the rear camera 422 may process the light and generate the image. The image may be output to the processor to be used to determine if the road is flooded and/or water wading conditions are present. In the illustrated example, only two cameras are shown. In other examples, however, the host vehicle 400 may include any number of cameras, and different cameras may point in different directions. For instance, a first camera may capture images of the road ahead of the host vehicle 400, a second camera may capture images of the road next to the host vehicle 400, and a third camera may capture images of the road behind the host vehicle 400. A flooded road condition and/or water wading condition may look the same in each image captured. For instance, distinguishing features of sections of the road, such as lane markers, potholes, cracks, etc., may not show up in images of a flooded road or water wading condition. A non-flooded road may look different in each image captured since the distinguishing features will be present in the images. Therefore, the images captured by the cameras may be used to determine if the road is flooded or if water wading conditions are present.

The tire pressure sensor 440, which may be part of a tire pressure monitoring system (TPMS), is implemented via circuits, chips, or other electronic components that can measure a tire pressure. In some instances, the tire pressure sensor 440 is located inside a vehicle tire. In some implementations, each tire may have the tire pressure sensor 440 measuring the tire pressure of its respective tire. Each tire pressure sensor 440 may be programmed to periodically measure the tire pressure. That is, the tire pressure sensor 440 may be programmed to measure the tire pressure at regular intervals of time. Thus, each tire pressure sensor 440 may be programmed to measure a first tire pressure at a first time and a second tire pressure at a second time. The measurement taken at the second time may occur after the measurement taken at the first time. For instance, the first time may be before the host vehicle 400 reaches the flood water and the second time may be while the host vehicle 400 is driving in the flood water. Each tire pressure sensor 440 may be programmed to output signals representing the tire pressure measurements. A first tire pressure signal may represent the measurement of the first tire pressure taken at the first time. A second tire pressure signal may represent the measurement of the second tire pressure taken at the second time. The first tire pressure signal and the second tire pressure signal may be output to the processor, and the processor may determine if the first tire pressure is different from the second tire pressure.

Proximity sensor 412 may be positioned at a rear end of the host vehicle 400 such as on the rear bumper, underneath the rear bumper, or on rear license plates. In another example, the proximity sensor 412 may be positioned at a front end of the host vehicle 400. For example, the proximity sensor 412 may be located on one or more of a front sub frame, bumper beam, engine bay bulkhead, suspension knuckle, or other similar component. In yet another example, one or more proximity sensors 412 may be positioned at the front end and/or at the rear end of the host vehicle 400. It should be appreciated that the examples provided herein are for illustrative purposes, and a greater or smaller number of proximity sensors 412 may be included at various locations of the vehicle without departing from the scope of this disclosure.

Proximity sensor 412 may be an ultrasonic sensor that may be capable of remotely sensing an obstacle or a surface (e.g., ground surface) in the vehicle's proximity, in one example. In other examples, electromagnetic sensors, optical sensors, capacitive sensors or other proximity determining sensors may be used. In examples where the vehicle is operating in water wading conditions, the proximity sensor may detect a presence of water and a proximity to water (e.g., water surface 406) prior to the vehicle being driven in water, such as when the vehicle is driving into a flooded area. In the event of the vehicle driving through water, the proximity sensor 412 may estimate a distance to water surface 406 and output the data to the processor. The processor may be able to estimate a height of water based on a difference in the distance output from sensor 412, from when the vehicle is traveling on dry ground compared to when the vehicle is being driven in water.

The processor of the flood detection system may be implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. As described above, the processor can receive the data from the tire pressure sensors 440, the proximity sensor 412, the exhaust gas sensors (not shown) and the images from the front camera 420 as well as the rear camera 422 and determine, from the data and images, if the road the host vehicle 400 is on is flooded. In response to water wading conditions, the control system may then strategically control vehicle operations (e.g., cylinder deactivation, vary timing of valve opening/closing, etc.) to maintain engine power without ingesting water. Therefore, the illustrated example shows entry conditions for employing VDE controls and VCT mechanism during drive through high water. More details will be presented in FIGS. 5-8 about how to employ VDE controls and VCT mechanism during water wading conditions.

Although illustrated as a sedan, the host vehicle 400 may include any passenger or commercial automobile such as a car, a truck, a sport utility vehicle, a crossover vehicle, a van, a minivan, a taxi, a bus, etc. Furthermore, the host vehicle 400 may be an autonomous vehicle that may be able to operate in an autonomous (e.g., driverless) mode, a partially autonomous mode, and/or a non-autonomous mode.

FIG. 5 shows three example plots of power delivered by each cylinder of an engine of a vehicle, as estimated by carrying out a cylinder power balance test at separate instances during water wading conditions. The engine may be a four-cylinder, variable displacement engine, such as the VDE 200 of FIG. 2. A common combustion instability that occurs due to water ingestion in an engine is a misfire, where ingestion of water in an engine cylinder may disrupt an air/fuel mixture of the engine. As described below, the three example plots of power may be used to diagnose a possible misfire scenario in an engine cylinder during water wading conditions. Misfires may be indicated by the cylinder power balance test, which may run with the engine combusting and compute RPM contribution of each cylinder's power stroke using a crankshaft position sensor as input.

In a power balance test, while the engine is operating, a controller (e.g., the controller 12 of vehicle 5 of FIG. 1) may selectively disable spark in a first engine cylinder to temporarily stop combustion in the first engine cylinder while maintain fueling and spark in each of the remaining engine cylinders. As combustion is stopped in the first cylinder, there is a corresponding drop in engine speed as estimated via a crankshaft position sensor (e.g., the crankshaft position sensor 141 of vehicle 5 of FIG. 1). The controller may then resume spark in the first cylinder and disable spark in the next cylinder to estimate the corresponding change in engine speed. The controller may monitor the change in engine speed after temporarily suspending combustion in each cylinder (one at a time). If a drop in engine speed corresponding to each engine cylinder is substantially equivalent (such as within 5% of one another), it may be inferred that each cylinder is equally contributing to a total engine power.

As depicted in FIG. 5, each of a first example plot 500, a second example plot 530, and a third example plot 560 show power delivered by the engine at three different instances, while the vehicle is driving through water wading conditions. The x-axis of each example plot shows a number of cylinders and the y-axis of each example plot shows an amount of power delivered by each cylinder of the number of cylinders. Bar chart 502 shows a power delivered by a first cylinder of a cylinder bank. Similarly, bar charts 504, 506, and 508 show a respective power delivered by a second, third, and fourth cylinder of the cylinder bank. Although described here as a four-cylinder engine, the example engine may include any number of cylinders, such as 6, 8, 10, 12, etc.

When the vehicle approaches a body of water and/or begins to drive through the body of water, the flood detection system of the vehicle may detect a presence of a water wading condition. For example, as described above with reference to FIG. 4, the water wading condition may be detected using an onboard camera, proximity sensor, tire pressure sensor, humidity sensor and/or a combination thereof. In response to detecting the water wading condition and/or a presence of water around the vehicle, the engine may deactivate and seal a maximum number of cylinders, while keeping a sufficient number of remaining cylinders active to maintain engine power. The deactivated cylinders, having been sealed, do not ingest water when the vehicle begins to drive through the water wading condition. Thus, the deactivated cylinders act as reserve cylinders to be fired later, if necessary. In the example plots 500, 530, and 560, two cylinders of the four-cylinder engine are deactivated and sealed for future use as soon as the flood detection system of the vehicle detects the water wading condition, while the sufficient number of remaining cylinders may remain active to maintain engine power to drive through the water wading condition.

In the first example plot 500, the first cylinder and the second cylinder produce nominal power output (represented by the bar charts 502 and 504) as the first and second cylinders are deactivated and sealed in response to detection of the water wading condition. The deactivated first and second cylinders act as standby cylinders that may be combusted later if the sufficient number of remaining cylinders (e.g., the active cylinders) ingest water. As depicted in the first example plot 500, each of the third cylinder and the fourth cylinder of the engine deliver an optimum power output (represented by the bar charts 506 and 508), indicating that only the third and fourth cylinders are active and combusting when the vehicle begins to drive through the water wading condition. In the illustrated example, the third and fourth cylinders are the cylinders of the four-cylinder engine that contribute to the total engine power to maintain torque in the beginning of the water wading condition. In other examples, however, any combination of cylinders may be selected for deactivation. For example, the third and fourth cylinders may be deactivated while maintaining the first and second cylinders active, or the first and third cylinders may be deactivated while maintaining the second and fourth cylinders active, or the second and third cylinders may be deactivated while maintaining the first and fourth cylinders active, or other similar combinations.

Although, in the illustrated example, two cylinders have been shown to be deactivated in response to the vehicle detecting the water wading condition, employing VDE controls in some examples may include deactivation of one or three cylinders of the engine. In yet other examples, deactivation of anywhere from 1-7 cylinders may be possible in a V-8 engine, for example, as described above with reference to FIGS. 3B-3D.

The second example plot 530 shows power delivered by each cylinder of the engine, as estimated by carrying out the cylinder power balance test while the vehicle is driving through the water wading condition with two of four cylinders deactivated. As shown in the illustrated example, the first cylinder and the second cylinder produce nominal power output (represented by the bar charts 502 and 504) as the first and second cylinders are deactivated and sealed. The fourth cylinder of the four-cylinder engine is active, delivering an optimum power output (represented by the bar chart 508), thereby contributing to the total engine power. However, as represented by the bar chart 506, although the third cylinder is active and combusting, it produces a very low power output. For example, the third cylinder may be producing a power output lower than a first threshold power 596. The first threshold power 596 may be a power output below which the cylinder may not be considered to contribute equally to the total engine power. This may be indicative of a misfire in the active cylinder due to water ingestion. In plot 530, the third cylinder of the four-cylinder engine is identified as delivering a lower than first threshold power (by the power balance test), and a fault is triggered by a misfire monitor in response to the lower than first threshold power. In other examples, a number of misfiring cylinders may vary and any of the active cylinders may be misfiring, depending on which cylinder ingests water during the water wading condition.

The third example plot 560 shows power delivered by each cylinder of the four-cylinder engine, as estimated by the power balance test during the water wading condition with VDE controls in operation. The third example plot 560 indicates a mitigating action taken in response to identifying the misfiring cylinder(s) in the second example plot 530. The identification of the misfiring cylinder(s) using the cylinder power balance test may be followed by a deactivation of the misfiring cylinder(s) while driving through the water wading condition to prevent further water ingestion in the cylinder. Concurrently, one of the previously deactivated dry cylinders may be reactivated immediately by fueling it and sparking it to combust to maintain engine power as the vehicle drives through the water wading condition. In the illustrated example, as the third cylinder is identified to be misfiring (e.g., as indicated in the second example plot 530) due to water ingestion, as a mitigating action, the third cylinder is deactivated while driving through the water wading condition. At the same time, the previously deactivated first cylinder of the four-cylinder engine is immediately reactivated to maintain a torque of the engine as the vehicle drives through the water wading condition. As such, in the third example plot 560, the third cylinder produces negligible power output (represented by the bar chart 506) as it is deactivated and sealed in response to a misfire. The first cylinder, being reactivated, delivers an optimum power output (represented by the bar chart 502), thereby contributing to the total engine power. No changes are observed in the power output of the second and fourth cylinders. In the illustrated example, the first cylinder is shown to be reactivated in response to the misfire; in additional embodiments, however, another previously deactivated cylinder may be selected for reactivation. For example, in another embodiment, the first cylinder may not be reactivated in response to the misfire, and the second cylinder may be reactivated in response to the misfire. In example engines with more than four cylinders, where more than two cylinders are previously deactivated due to detection of the water wading condition, in response to a misfire in an active cylinder, any previously deactivated cylinders may be reactivated to maintain engine power during the water wading condition.

FIG. 6 shows three example plots of power delivered by each cylinder of an engine of a vehicle, as estimated by carrying out a cylinder power balance test at separate instances during a water wading condition. The engine may be a four-cylinder, variable displacement engine, such as the VDE 200 of FIG. 2. Apart from misfires, hydrolock is another common combustion instability that may occur in an engine due to water ingestion. Hydrolock occurs when a volume of liquid greater than a volume of a cylinder at its minimum enters the cylinder. Since liquids are nearly incompressible, a piston of the hydrolocked cylinder may thus be unable to complete its travel cycle without a mechanical failure. As described below, the three example plots of power may be used to diagnose a possible hydrolock event in an engine cylinder during the water wading condition. Hydrolock events may be indicated by the cylinder power balance test described herein above, which may run with the engine combusting and compute RPM contribution of each cylinder's power stroke using a crankshaft position sensor as input.

As depicted in FIG. 6, each of a first example plot 600, a second example plot 630, and a third example plot 660 show power delivered by the engine at three different instances, while the vehicle is driving through the water wading condition. The x-axis of each example plot shows a number of cylinders and the y-axis of each example plot shows an amount of power delivered by each cylinder of the number of cylinders. Bar chart 602 shows a power delivered by a first cylinder of a cylinder bank. Similarly, bar charts 604, 606, and 608 show a respective power delivered by a second, third, and fourth cylinder of the cylinder bank. Although described here as a four-cylinder engine, the example engine may include any number of cylinders, such as 6, 8, 10, 12, etc.

As the vehicle begins to drive through standing water, (e.g., a flooded road), the flood detection system of the vehicle may detect the water wading condition (e.g., by using an onboard camera, tire pressure sensor, etc.), in response to which the engine of the vehicle may deactivate and seal a maximum number of cylinders, while keeping a sufficient number of remaining cylinders active to maintain engine power. As shown in the first example plot 600, two cylinders of the engine are deactivated and sealed, while two cylinders of the engine remain active to maintain engine power to drive the vehicle through the water wading condition. The first cylinder and the second cylinder produce nominal power output (represented by the bar charts 602 and 604) as the first and second cylinders are deactivated and sealed in response to detection of the water wading condition. The deactivated first and second cylinders may act as standby cylinders that may be combusted later if the sufficient number of remaining cylinders (e.g., the active cylinders) ingest water. On the other hand, each of the third cylinder and the fourth cylinder deliver an optimum power output (represented by the bar charts 606 and 608), indicating that the third and fourth cylinders of the engine are active and combusting when the vehicle begins to drive through the water wading condition. Thus, the third and fourth cylinders are the cylinders of the engine that contribute to the total engine power to maintain torque in the beginning of the water wading conditions, while the first and second cylinders do not contribute to the total engine power. In other examples, however, a different combination of cylinders may be selected for deactivation. For example, the third and fourth cylinders may be deactivated while maintaining the first and second cylinders active, or the first and third cylinders may be deactivated while maintaining the second and fourth cylinders active, or the second and third cylinders may be deactivated while maintaining the first and fourth cylinders active, or other similar combinations.

Although in plot 600 two cylinders have been shown to be deactivated in response to the vehicle detecting water wading conditions, employing VDE controls in some examples may include deactivation of one or three cylinders of the engine. In yet other examples, deactivation of anywhere from 1-7 cylinders may be possible in a V-8 engine, for example, as described above with reference to FIGS. 3B-3D.

The second example plot 630 shows power delivered by each cylinder of the engine, as estimated by carrying out the cylinder power balance test while the vehicle is driving through water wading conditions with two of four cylinders deactivated. As shown in the illustrated example, the first cylinder and the second cylinder are deactivated and sealed, and produce negligible power output (represented by the bar charts 602 and 604). The fourth cylinder of the four-cylinder engine is active, delivering an optimum power output (represented by the bar chart 608), thereby contributing to the total engine power. However, as represented by the bar chart 606, although the third cylinder is active and combusting, it produces an abnormally high power output. For example, the third cylinder may be producing a power output higher than a second threshold power 696. The second threshold power 696 may be a power output above which the cylinder may not be considered contributing equally to the total engine power. This may be indicative of a hydrolock due to ingestion of water in the active cylinder, wherein the water is being overly compressed. In the second example plot 630, the third cylinder of the four-cylinder engine is identified as delivering a higher than second threshold power (by the power balance test) and a fault is triggered by a hydrolock monitor in response to the higher than second threshold power. In other examples, a number of hydrolocked cylinders may vary and any of the active cylinders (e.g., the fourth cylinder) may be hydrolocked, depending on which cylinder ingests water during the water wading condition.

The third example plot 660 shows power delivered by each cylinder of the four-cylinder engine, as estimated by the power balance test during the water wading condition with VDE controls in operation. The third example plot 660 indicates a mitigating action taken in response to identifying the hydrolocked cylinder(s) in the second example plot 630. The identification of the hydrolocked cylinder(s) using the power balance test may be followed by a control of the camshaft to delay a closure of the intake valves of the active cylinders via a VCT system (e.g., VCT system 232), while driving through the water wading condition. Controlling the intake valves of the active cylinders in accordance with a late intake valve closure (LIVC) strategy may help reduce an effective compression ratio. The LIVC control strategy allows a portion of a compression energy generated to be vented back into an intake manifold of the engine by adjusting a timing of the intake valve closure of the cylinders. This ensures that the engine will not overly compress any water that may be ingested into the cylinders as the compression power has been reduced, while maintaining engine power as the vehicle drives through the water wading condition. As the third cylinder in the second example plot 630 is identified to be hydrolocked due to water ingestion, as a mitigating action, cylinder compression is reduced by employing the LIVC strategy using the vehicle's VCT system, while driving through the water wading condition. This reduces the overall compression and hence the engine power. As such, in the third example plot 660, the third cylinder produces a lower than optimum power output (represented by the bar chart 606) as the cylinder compression is reduced in response to the hydrolock. As depicted in the third example plot 660, the fourth cylinder is active (although not hydrolocked) and contributing to the total engine power, yet delivering a lower than optimum power output (represented by the bar chart 608) because a common camshaft of the VCT system is used to control valve operation of a group of cylinders, as described above with reference to FIG. 2. Therefore, as the timing of an intake valve closure is adjusted, the timing of the intake valve closure of all the active cylinders in the group is changed/adjusted (e.g., delayed), thereby reducing compression in the active cylinders. Hence, power outputs of the active cylinders may be changed (e.g., reduced) similarly. No changes are observed in a power output of each of the first cylinder (bar chart 602) and the second cylinder (bar chart 604), as the first and second cylinders remain deactivated and sealed and are reactivated in case of a misfire as described previously with reference to FIG. 5. While deactivating cylinders and performing a late intake valve closure reduces engine power, vehicles typically do not need a high amount of power when driving through water wading conditions at low speeds.

Figure 7:
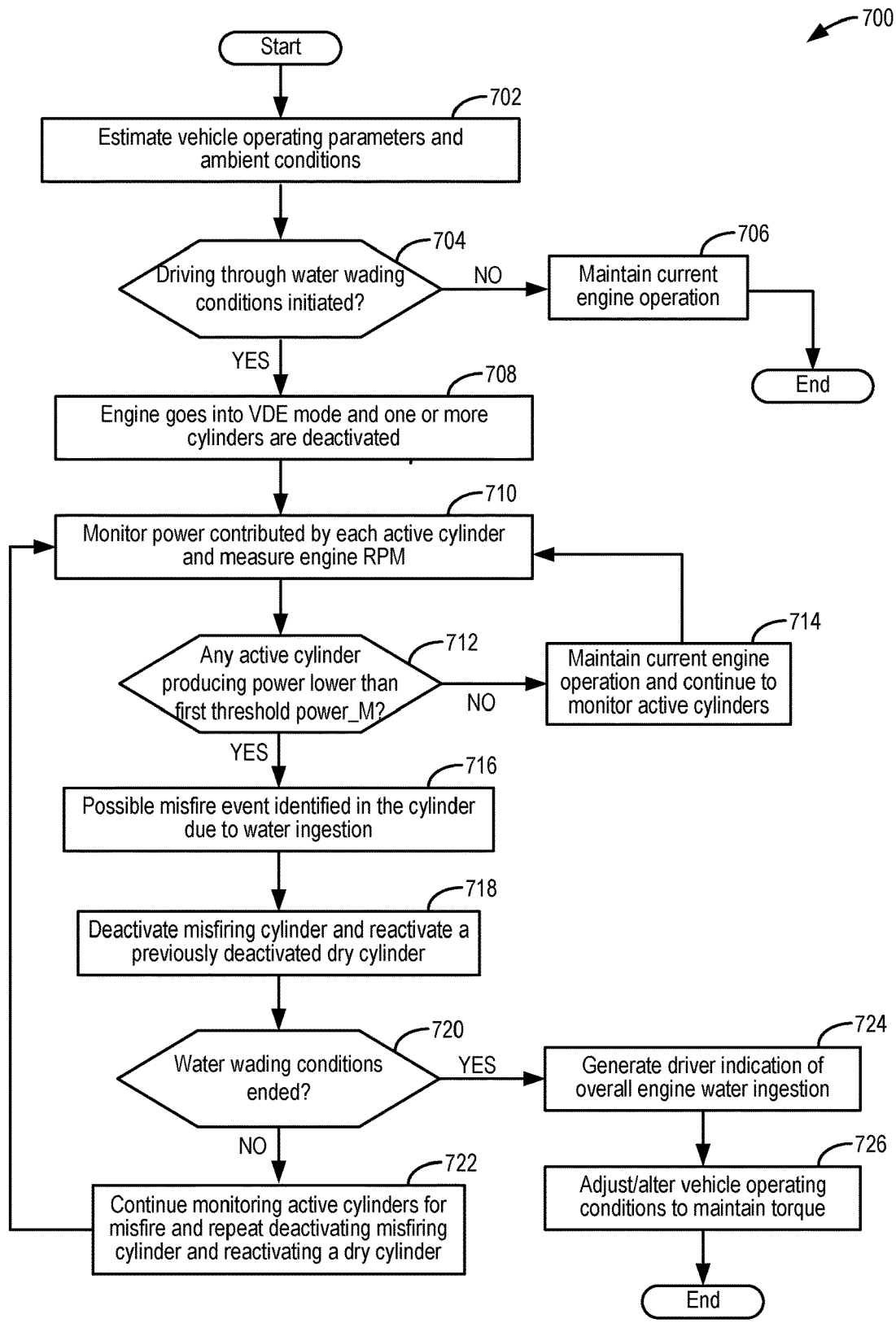
FIG. 7 shows a high-level flow chart illustrating an example method for mitigating a possible misfire scenario while driving through water wading conditions.

Turning to FIG. 7, an exemplary method 700 is shown for mitigating a possible misfire scenario (such as the misfire indicated in the second example plot 530 of FIG. 5) in a vehicle engine (e.g., VDE 200 of FIG. 2), while driving through water wading conditions. Instructions for carrying out method 700 and the rest of the methods included herein may be executed by a controller (e.g., the controller 12 of FIGS. 1 and 2) based on instructions stored on a memory of the controller and in conjunction with signals received from sensors of the engine system of the vehicle, such as the sensors described above with reference to FIGS. 1 and 4. The controller may employ engine actuators of the engine system to adjust operation of an engine of the vehicle, according to the methods described below.

At 702, current vehicle and engine operating conditions may be estimated and/or measured. The engine operating conditions may include, for example, operator torque demand, engine speed, vehicle speed, engine temperature, engine load, exhaust temperature, manifold pressure, manifold air flow, battery state of charge, etc. In addition, ambient conditions such as ambient humidity, temperature, barometric pressure may be estimated and ambient road conditions may be monitored. In one example, ambient humidity may be measured via one or more of an ambient humidity sensor (such as ambient humidity sensor 123 of FIG. 1). Ambient humidity conditions at a current vehicle location may also be obtained from weather data, as retrieved from an external network communicatively coupled to the vehicle via wireless communication. In some embodiments, road conditions surrounding the vehicle may be monitored by onboard cameras (e.g., front camera 420 and/or rear camera 422 of FIG. 4 or onboard camera 115 of FIG. 1). For example, image data received from the onboard cameras may include details of water wading conditions. The water wading conditions may also be detected by tire pressure sensors (e.g., the tire pressure sensor 440 of FIG. 4) and/or proximity sensors (e.g., the proximity sensor 412 of FIG. 4) of the vehicle.

At 704, method 700 may include determining whether the water wading conditions are encountered by the vehicle. Determining the initiation of the water wading conditions may include detection of water surrounding the vehicle by one or more of onboard cameras, humidity sensors, tire pressure sensors, proximity sensors and/or a combination thereof. For example, onboard cameras (such as onboard camera 115) and/or a proximity sensor (such as proximity sensor 412) may detect proximity of the vehicle components to a water surface of the water wading conditions. Additionally, if a humidity sensor (e.g., ambient humidity sensor 123) mounted inside the intake manifold registers a high reading, it may indicate water ingestion into the intake manifold, suggesting the initiation of the water wading conditions. Determining the initiation of the water wading conditions may decide whether conditions for employing VDE mode are met.

If it is determined at 704 that the water wading conditions have not initiated, method 700 may proceed to 706, where the method may include maintaining current engine operation and VDE mode may not be employed in the vehicle engine. Method 700 then ends. Alternatively, if it is determined at 704 that the water wading conditions have initiated, then conditions for employing VDE mode are met and the method may proceed to 708.

At 708, method 700 may include employing VDE mode into the vehicle engine and one or more cylinders may be deactivated and sealed in response to the initiation of the water wading conditions. In one example, the VDE may be engaged to deactivate and seal a maximum number of cylinders of the plurality of cylinders present in an engine, where the maximum number is a highest number of cylinders that may be deactivated while maintaining a minimum engine power. In another example, the controller may select a portion/subset of the plurality of cylinders for deactivation. The selection may be based on hardware of the engine. For example, when the engine is a V-8 engine, the hardware may selectively maintain two cylinders active from each of the first and second engine banks, and deactivate a remaining number of cylinders. The selected cylinders may be deactivated by disabling respective fuel injectors (e.g., fuel injector 166 of FIG. 1), and disabling respective spark ignition of the cylinders. The intake and exhaust valves (e.g., intake valve 150 and exhaust valve 156 of FIG. 1) of the deactivated cylinders may be held closed. The intake and exhaust valves may be closed, for example, via a cam profile switching mechanism in which a cam with no lift is used or by actuating a valve deactivator (e.g., a VDE actuator), as described previously with respect to FIG. 2. As the deactivated cylinders are sealed, the deactivated cylinders may not ingest water and may be reserved for future use in case the active cylinders show combustion instabilities from water ingestion. While fuel injectors of the disabled cylinders are turned off, the remaining enabled cylinders continue to carry out combustion, with corresponding fuel injectors and intake and exhaust valves active and operating to meet torque requirements during the water wading conditions.

At 710, method 700 may include monitoring a power contributed by each active cylinder of the engine and measuring an engine RPM as the vehicle drives through the water wading conditions. In one example, this may be carried out by using an onboard cylinder power balance test, as described previously with reference to FIG. 5. The onboard power balance test may run with the engine combusting and compute an RPM contribution of each cylinder's power stroke using a crankshaft position sensor as input, as described in FIG. 5. In some examples, the power balance test may indicate if any of the active cylinders of the engine is ingesting water causing combustion instability, by identifying one or more cylinders contributing either a lower or a higher than threshold engine power.

At 712, method 700 may include determining whether an active cylinder of the engine is delivering a power lower than a first threshold power M, based on the cylinder power balance test. For example, as described with reference to FIG. 5, a third active cylinder of a four-cylinder engine may produce a power lower than the first threshold power represented by line 596, during the water wading conditions. If it is determined at 712 that none of the active cylinders of the engine are delivering a power lower than the first threshold power M, method 700 may proceed to 714, where the method may include maintaining current engine operation and the monitoring of power contributed by active cylinders may be continued. As such, method 700 may then return to 710. Alternatively, if it is determined at 712 that one or more cylinders of the engine is delivering a power lower than the first threshold power M, the method may proceed to 716.

At 716, method 700 may include identifying a possible misfire event in the cylinder(s) that produces power lower than the first threshold power M, due to water ingestion. Misfire events may occur in active cylinders of the engine during the water wading conditions, as ingested water may disrupt an air fuel ratio within the cylinders. Accordingly, the misfire monitor may trigger a fault in response to one or more misfiring cylinder(s).

To mitigate the possible misfire event, at 718, method 700 may include deactivating the one or more misfiring cylinders while driving through the water wading conditions to prevent additional water ingestion in the one or more misfiring cylinders; while at the same time reactivating one or more previously deactivated dry cylinders by supplying fuel and sparking to maintain engine power during the water wading conditions. For example, fuel injectors (e.g., fuel injector 166 of FIG. 1), intake and exhaust valves (e.g., intake valve 150 and exhaust valve 156 of FIG. 1), and spark ignition of the misfiring cylinder may be deactivated. Additionally, fuel injectors, intake and exhaust valves, and spark ignition of the one or more previously deactivated dry cylinders (e.g., cylinders deactivated at the beginning of the water wading conditions) may be reactivated to replace the misfiring cylinder. Reactivation of a deactivated cylinder may occur, for example, via the cam profile switching mechanism or by deactivating a valve deactivator, to allow fresh charge air to enter the deactivated cylinder and exhaust to exit the deactivated cylinder. Thereby, combustion resumes in one of the cylinders that was deactivated during the VDE mode. This allows some engine power to be maintained, as the vehicle drives through the water wading conditions without the engine stalling.

At 720, method 700 may include determining whether the water wading conditions have ended. This may include, for example, one or more onboard cameras, humidity sensors, tire pressure sensors, proximity sensors detecting presence of water surrounding the vehicle and/or proximity of the vehicle components to water surface, as described previously with reference to FIG. 4. If it is determined at 720 that the water wading conditions have not ended, method 700 may proceed to 722. At 722, method 700 may include continuing to monitor active cylinders for misfire, and repeat deactivating any misfiring cylinder and reactivating a dry cylinder. Accordingly, method 700 may proceed back to 710. Alternatively, if it is determined at 720 that the water wading conditions have ended, method 700 may proceed to 724.

At 724, method 700 may include generating a driver indication of an overall engine water ingestion. In some examples, the generated driver indication may be displayed to the vehicle operator (e.g., vehicle operator 130) at a vehicle instrument panel or other display visible to the vehicle operator. In such examples, the driver indication may indicate a status of the engine cylinders being wet or dry, in addition to instructions for repairing misfired cylinders or recommendations as to maintenance of any degraded component.

At 726, method 700 may include adjusting or altering vehicle operating parameters to maintain a torque of the engine. For example, one or more of the engine operating parameters may be altered or adjusted (e.g., minimized, maintained below respective thresholds, lowered to near or at zero, etc.), including, for example, one or more of the engine speed and the engine load. In one example, the vehicle engine may be adjusted to remain in the VDE mode with water-ingested misfiring cylinders deactivated and dry cylinders being active and contributing to engine power. Additionally or alternatively, if the vehicle is a hybrid vehicle, the controller (e.g., controller 12) may command the vehicle enter an electric drive mode where only a motor (e.g., electric machine 52) may propel drive wheels of the vehicle so that the fueling system (e.g., fuel system 172) is not relied upon to power the engine.

Figure 8:
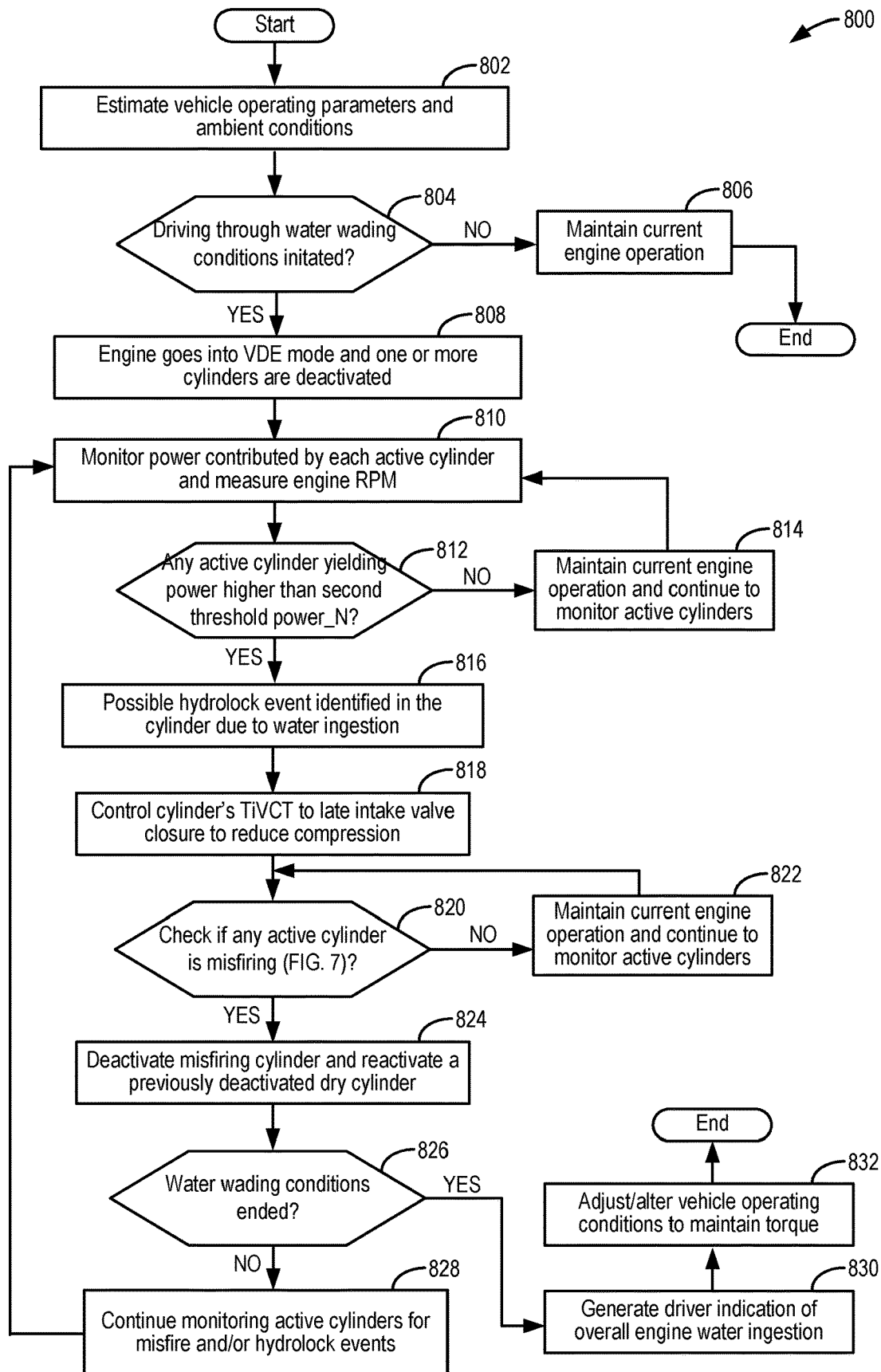
FIG. 8 shows a high-level flow chart illustrating an example method for mitigating a possible hydrolock scenario and a misfire scenario during water wading conditions.
Figure 9:
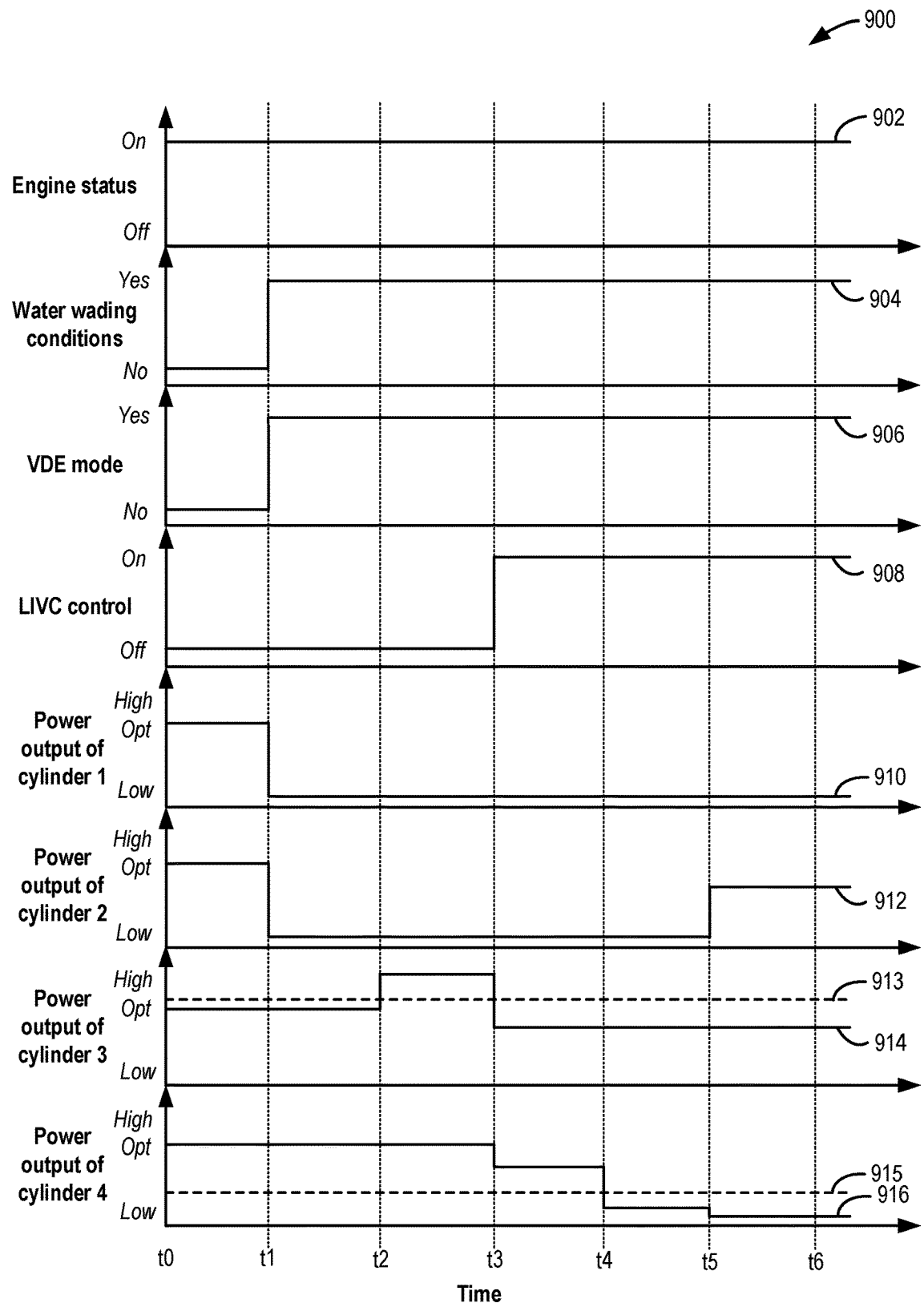
FIG. 9 shows a timeline graph depicting engine operating parameters for a vehicle traveling through water wading conditions.

Referring to FIG. 8, an exemplary method 800 is shown for mitigating a possible hydrolock scenario and a misfire scenario (e.g., the hydrolock scenario of FIG. 6 and the misfire scenario of FIG. 5) in a vehicle engine (e.g., VDE 200 of FIG. 2), during water wading conditions. Instructions for carrying out method 800 and the rest of the methods included herein may be executed by a controller (e.g., the controller 12 of FIGS. 1 and 2) based on instructions stored on a memory of the controller and in conjunction with signals received from sensors of the engine system of the vehicle, such as the sensors described above with reference to FIGS. 1 and 4. The controller may employ engine actuators of the engine system to adjust operation of an engine of the vehicle, according to the methods described below.

At 802, current vehicle and engine operating conditions may be estimated and/or measured. The engine operating conditions may include, for example, operator torque demand, engine speed, vehicle speed, engine temperature, engine load, exhaust temperature, manifold pressure, manifold air flow, battery state of charge, etc. In addition, ambient conditions such as ambient humidity, temperature, barometric pressure may be estimated and ambient road conditions may be monitored. In one example, ambient humidity may be measured via one or more of an ambient humidity sensor (such as ambient humidity sensor 123 of FIG. 1). Ambient humidity conditions at a current vehicle location may also be obtained from weather data, as retrieved from an external network communicatively coupled to the vehicle via wireless communication. In some embodiments, road conditions surrounding the vehicle may be monitored by onboard cameras (e.g., front camera 420 and/or rear camera 422 of FIG. 4 or onboard camera 115 of FIG. 1). For example, image data received from the onboard cameras may include details of water wading conditions. The water wading conditions may also be detected by tire pressure sensors (e.g., the tire pressure sensor 440 of FIG. 4) and/or proximity sensors (e.g., the proximity sensor 412 of FIG. 4) of the vehicle.

At 804, method 800 may include determining whether the water wading conditions are encountered by the vehicle. Determining the initiation of the water wading conditions may include detection of water surrounding the vehicle by one or more of onboard cameras, humidity sensors, tire pressure sensors, proximity sensors and/or a combination thereof. For example, onboard cameras (such as onboard camera 115) and/or a proximity sensor (such as proximity sensor 412) may detect proximity of the vehicle components to a water surface of the water wading conditions. Additionally, if a humidity sensor (e.g., ambient humidity sensor 123) mounted inside the intake manifold registers a high reading, it may indicate water ingestion into the intake manifold, suggesting the initiation of the water wading conditions. Determining the initiation of the water wading conditions may decide whether conditions for employing VDE mode are met.

If it is determined at 804 that the water wading conditions have not initiated, method 800 may proceed to 806, where the method may include maintaining current engine operation and VDE mode may not be employed in the vehicle engine. Method 800 then ends. Alternatively, if it is determined at 804 that the water wading conditions have initiated, then conditions for employing VDE mode are met and the method may proceed to 808.

At 808, method 800 may include employing VDE mode into the vehicle engine and one or more cylinders may be deactivated and sealed in response to the initiation of the water wading conditions. In one example, the VDE may be engaged to deactivate and seal a maximum number of cylinders of the plurality of cylinders present in an engine, where the maximum number is a highest number of cylinders that may be deactivated while maintaining a minimum engine power. In another example, the controller may select a portion/subset of the plurality of cylinders for deactivation. The selection may be based on hardware of the engine. For example, when the engine is a V-8 engine, the hardware may selectively maintain two cylinders active from each of the first and second engine banks, and deactivate a remaining number of cylinders. The selected cylinders may be deactivated by disabling respective fuel injectors (e.g., fuel injector 166 of FIG. 1), and disabling respective spark ignition of the cylinders. The intake and exhaust valves (e.g., intake valve 150 and exhaust valve 156 of FIG. 1) of the deactivated cylinders may be held closed. The intake and exhaust valves may be closed, for example, via a cam profile switching mechanism in which a cam with no lift is used or by actuating a valve deactivator (e.g., a VDE actuator), as described previously with respect to FIG. 2. As the deactivated cylinders are sealed, the deactivated cylinders may not ingest water and may be reserved for future use in case the active cylinders show combustion instabilities from water ingestion. While fuel injectors of the disabled cylinders are turned off, the remaining enabled cylinders continue to carry out combustion, with corresponding fuel injectors and intake and exhaust valves active and operating to meet torque requirements during the water wading conditions.

At 810, method 800 may include monitoring a power contributed by each active cylinder of the engine and measuring engine RPM as the vehicle drives through water. In one example, this may be carried out by using an onboard cylinder power balance test, as described previously with reference to FIGS. 5 and 6. The onboard power balance test may run with the engine combusting and compute RPM contribution of each cylinder's power stroke using a crankshaft position sensor as input, as described in FIGS. 5 and 6. In some examples, the power balance test may indicate if any of the active cylinders of the engine is ingesting water causing combustion instability, by identifying one or more cylinders contributing either a lower or a higher than threshold engine power.

At 812, method 800 may include determining whether any active cylinder of the engine is delivering a power higher than a second threshold power N based on the cylinder power balance test. For example, as described with reference to FIG. 6, a third active cylinder of a four-cylinder engine may yield a power higher than the second threshold power represented by line 696, during water wading conditions. If it is determined at 812 that none of the active cylinders of the engine are delivering a power higher than the second threshold power N, method 800 may proceed to 814, where the method may include maintaining current engine operation and the monitoring of power contributed by active cylinders may be continued. As such, method 800 may then return to 810. Alternatively, if it is determined at 812 that one or more cylinders of the engine is delivering a power higher than the second threshold power N, the method may proceed to 816.

At 816, method 800 may include identifying a possible hydrolock event in the cylinder(s) that yields power higher than the second threshold power N, due to water ingestion. Hydrolock events may occur in active cylinders of the engine during the water wading conditions, when a volume of water greater than a volume of cylinder at its minimum enters the cylinder. Since water is nearly incompressible, piston of the hydrolocked cylinder is thus unable to complete its travel cycle without a mechanical failure. Accordingly, a hydrolock monitor may trigger a fault in response to the hydrolocked cylinder(s).

To mitigate the possible hydrolock event, at 818, method 800 may include controlling VCT system (e.g., VCT system 232) of the engine to a late intake valve closure (LIVC) strategy to reduce compression during the water wading conditions. As described previously with reference to FIG. 6, controlling intake valves of the active cylinders to the LIVC control strategy ensures that the engine (e.g., VDE 200) does not overly compress any water that may be ingested into the active cylinders as the compression power has been reduced, yet maintaining engine power as the vehicle drives through the water wading conditions.

At 820, method 800 may include determining whether any active cylinder is also misfiring, due to water ingestion. For example, method 800 may utilize the steps 710, 712, and 716 of FIG. 7 in order to determine the occurrence of misfire events in one or more active cylinders of the engine during the water wading conditions. If it is determined at 820 that none of the active cylinders of the engine are misfiring, method 800 may proceed to 822, where the method may include maintaining current engine operation and the monitoring of active cylinders for misfire events may be continued. As such, method 800 may then return to 820. Alternatively, if it is determined at 820 that one or more active cylinders of the engine is misfiring, the method may proceed to 824.

To mitigate the possible misfire event, at 824, method 800 may include deactivating the one or more misfiring cylinder while driving through the water wading conditions to prevent additional water ingestion in the one or more misfiring cylinder; while at the same time reactivating one or more previously deactivated dry cylinders by supplying fuel and sparking to maintain engine power during the water wading conditions. For example, fuel injectors (e.g., fuel injector 166 of FIG. 1), intake and exhaust valves (e.g., intake valve 150 and exhaust valve 156 of FIG. 1), and spark ignition of the misfiring cylinder may be deactivated. Additionally, fuel injectors, intake and exhaust valves, and spark ignition of the one or more previously deactivated dry cylinders (e.g., cylinders deactivated at the beginning of the water wading conditions) may be reactivated to replace the misfiring cylinder. Reactivation of a deactivated cylinder may occur, for example, via the cam profile switching mechanism or by deactivating a valve deactivator, to allow fresh charge air to enter the deactivated cylinder and exhaust to exit the deactivated cylinder. Thereby, combustion resumes in one of the cylinders that was deactivated during the VDE mode. This allows some engine power to be maintained, as the vehicle drives through the water wading conditions without the engine stalling.

At 826, method 800 may include determining whether the water wading conditions have ended. This may include, for example, one or more onboard cameras, humidity sensors, tire pressure sensors, proximity sensors detecting presence of water surrounding the vehicle and/or proximity of the vehicle components to water surface, as described previously with reference to FIG. 4. If it is determined at 826 that the water wading conditions have not ended, method 800 may proceed to 828. At 828, method 800 may include continuing to monitor active cylinders for hydrolock and/or misfire events, and repeat LIVC strategy and/or repeat deactivating a misfiring cylinder and reactivating a previously deactivated dry cylinder. Accordingly, method 800 may proceed back to 810. Alternatively, if it is determined at 826 that the water wading conditions have ended, method 800 may proceed to 830.

At 830, method 800 may include generating a driver indication of an overall engine water ingestion. In some examples, a generated driver indication may be displayed to the vehicle operator (e.g., vehicle operator 130) at a vehicle instrument panel or other display visible to the vehicle operator. In such examples, the driver indication may indicate a status of the engine cylinders being wet or dry, in addition to instructions for repairing misfired cylinders or recommendations as to maintenance of any degraded component.

At 832, method 800 may include adjusting or altering vehicle operating parameters to maintain torque. For example, one or more of the engine operating parameters may be altered or adjusted (e.g., minimized, maintained below respective thresholds, lowered to near or at zero, etc.), including, for example, one or more of the engine speed and the engine load. In one example, the vehicle engine may be adjusted to remain in the VDE mode with water-ingested misfiring cylinders deactivated and dry cylinders being active and contributing to engine power. Additionally or alternatively, the controller (e.g., controller 12) may command the vehicle enter an electric drive mode, if the vehicle is a hybrid vehicle, where only a motor (e.g., electric machine 52) may propel drive wheels of the vehicle so that the fueling system (e.g., fuel system 172) is not relied upon to power the engine (e.g., engine 10 or VDE 200).

Referring to FIG. 9, a timing diagram 900 is shown that illustrates engine operating parameters along with VDE controls and VCT mechanism for a vehicle traveling through water wading conditions. The timing diagram 900 may be same as or similar to the method flowcharts described above in reference to steps 702-726 of method 700 in FIG. 7 and/or steps 802-832 of method 800 in FIG. 8. Instructions for performing the actions described in the timing diagram 900 may be executed by a controller (e.g., the controller 12 of control system 11 of FIGS. 1-2) based on instructions stored on a memory of the controller and in conjunction with signals received from sensors of the vehicle, such as the sensors 24 coupled to VDE 200 of the vehicle 5 described above with reference to FIGS. 1-2.

Timing diagram 900 shows plots 902, 904, 906, 908, 910, 912, 914, and 916, which illustrate states of components of the vehicle over time. Plot 902 indicates a state of an engine of the vehicle (e.g., the engine 10 of the vehicle 5 of FIG. 1), which may be in an ON state or an OFF state. Plot 904 indicates whether or not the water wading conditions are present (e.g., as shown in FIG. 4), where YES indicates that the water wading conditions are present and NO indicates that the water conditions are not present. Plot 906 indicates whether or not the engine is being operated in a VDE mode with a number of cylinders deactivated (e.g., as shown in FIGS. 3B-3D). Plot 908 indicates a state of an LIVC control of a VCT system (e.g., the VCT system 232 of the engine 200 of FIG. 2), which may be in an ON state or an OFF state. Plots 910, 912, 914 and 916 show a power output of a first cylinder, a power output of a second cylinder, a power output of a third cylinder and a power output of a fourth cylinder, respectively, of an example four-cylinder engine where each cylinder may show a low, a high, or an optimum power output depending on the amount of water ingestion during the water wading conditions (e.g., as shown previously by various example plots in FIGS. 5 and 6). Dotted line 913 represents a second threshold power (e.g., the second threshold power 696 of FIG. 6), which may be defined as the power output above which a particular cylinder may be considered to be contributing unequally (e.g., higher than a normal range) to the total engine power. Dotted line 915 represents a first threshold power (e.g., the first threshold power 596 of FIG. 5), which may be defined as the power output below which a particular cylinder may be considered to be contributing unequally (e.g., lower than a normal range) to the total engine power.

Plots 902, 904, 906, 908, 910, 912, 914, and 916 illustrate states of the above mentioned components of the vehicle system across six durations: a first duration from time t0 to time t1; a second duration from time t1 to time t2; a third duration from time t2 to time t3; a fourth duration from time t3 to time t4; a fifth duration from time t4 to time t5; and a sixth duration from time t5 to time t6.

At time to, the vehicle engine is in an ON state at plot 902. However, the water wading conditions are not present at plot 904 at time t0, i.e., the vehicle is not driving through water at time t0. As such, at time t0 the engine is not being operated in VDE mode at plot 906, and the LIVC control via the VCT mechanism at plot 908 is in an OFF state. Accordingly, at time t0 each of the first cylinder, second cylinder, third cylinder, and fourth cylinder produces an optimum power output as indicated by the plots 910, 912, 914 and 916, respectively. In one example, the vehicle is being driven at time t0 on a road without standing water. Since the water wading conditions are not met at time t0, none of the cylinders of the engine are deactivated. Additionally, over the first duration from t0 to t1, plot 902 for engine status, plot 904 for water wading conditions, plot 906 for VDE mode, plot 908 for LIVC control, plot 910 for power output of the first cylinder, plot 912 for power output of the second cylinder, plot 914 for power output of the third cylinder, and plot 916 for power output of the fourth cylinder remain unchanged.

At time t1, the vehicle engine is in an ON state at plot 902 and the water wading conditions begin at plot 904, i.e., the vehicle initiates driving through the standing water at time t1. Thus, the entry conditions for employing VDE controls are met at time t1. As such, at time t1, the engine begins to operate in VDE mode at plot 906. Accordingly, at time t1, the first cylinder and the second cylinder of the four-cylinder engine are deactivated and sealed as represented by the nominal power output at plots 910 and 912, respectively. The third cylinder and the fourth cylinder of the four-cylinder engine remain activated to power the engine as the vehicle drives through the standing water. Thus, each of the third cylinder and the fourth cylinder shows optimum power output at time t1 at plots 914 and 916, respectively. Over the second duration from time t1 to time t2, plots 902, 904, 906, 908, 910, 912, 914, and 916 remain unchanged.

At time t2, the vehicle engine remains in an ON state at plot 902 and the water wading conditions are continued at plot 904. As such, at time t2, the engine remains in VDE mode at plot 906; however, the LIVC control at plot 908 remains in an OFF state. At time t2, the first cylinder and the second cylinder of the four-cylinder engine remain deactivated and sealed as represented by the nominal power output at plots 910 and 912, respectively. These cylinders are dry and act as standby cylinders for future use. The fourth cylinder remains active and shows optimum power output at time t2 at plot 916. The third cylinder, however, delivers a power output higher than a second threshold power 913 as represented by plot 914 at time t2, thereby indicating a possible hydrolock event due to water ingestion. Over the third duration from time t2 to time t3, plots 902, 904, 906, 908, 910, 912, 914, and 916 remain unchanged.

At time t3, the vehicle engine remains in an ON state at plot 902 and the water wading conditions are continued at plot 904. As such, at time t3, the engine remains in VDE mode at plot 906. Therefore, the first cylinder and the second cylinder of the engine remain deactivated, at time t3, as indicated by the nominal power output at plots 910 and 912, respectively. The hydrolock event identified in the third cylinder (at time t2) is mitigated by turning the LIVC control strategy to an ON state, as indicated by plot 908 at time t3, which reduces cylinder compression power. Thus, at time t3, the third cylinder delivers a lower-than-optimum power output at plot 914. Since the LIVC strategy controls valve operation of all the cylinders via a common camshaft of the VCT system, the compression of the fourth cylinder also decreases as the LIVC strategy is turned ON, thereby delivering a lower-than-optimum power output as indicated by plot 916 at time t3. In this way, the active third and fourth cylinders do not overly compress any water that may have been ingested into the cylinders, while maintaining an engine power needed for vehicle propulsion as the vehicle drives through the standing water. Over the fourth duration from time t3 to time t4, plots 902, 904, 906, 908, 910, 912, 914, and 916 remain unchanged.

At time t4, the vehicle engine remains in an ON state at plot 902 and the water wading conditions are continued at plot 904. As such, at time t4, the engine remains in VDE mode as indicated by plot 906. Accordingly, the first cylinder and the second cylinder of the engine remain deactivated, at time t4, as indicated by the nominal power output at plots 910 and 912, respectively. The LIVC control strategy at plot 908 remains in an ON state to control the intake valves of the active cylinders. The third cylinder remains active and maintains a power output as indicated by plot 914 at time t4. The fourth cylinder, however, delivers a power output lower than a first threshold power 915 as represented by plot 916 at time t4, thereby indicating a possible misfire event due to water ingestion. Over the fifth duration from time t4 to time t5, plots 902, 904, 906, 908, 910, 912, 914, and 916 remain unchanged.

At time t5, the vehicle engine remains in an ON state at plot 902 and the water wading conditions are still continued at plot 904. As such, at time t5, the engine remains in VDE mode at plot 906. The misfire event identified in the fourth cylinder (at time t4) is mitigated by deactivating the misfiring fourth cylinder and reactivating one of the previously deactivated dry cylinders at time t5. When the fourth cylinder is deactivated in response to the misfire, a negligible power output of the fourth cylinder is observed at plot 916; while the second, previously deactivated cylinder is reactivated at time t5 to replace a wet misfiring cylinder with a dry functioning cylinder. Accordingly, the second cylinder of the engine begins to produce a power output as indicated by plot 912 to maintain engine power and thus vehicle propulsion through the standing water of the water wading conditions.

The third cylinder remains active and maintains a power output as indicated by plot 914. The first cylinder of the engine remains deactivated, at time t5, as indicated by the negligible power output at plot 910, thereby serving as a standby dry cylinder for future use. The LIVC control strategy at plot 908 remains in an ON state, at time t5, to maintain a control of the intake valves of the active cylinders via the VCT system. Over the sixth duration from time t5 to time t6, plots 902, 904, 906, 908, 910, 912, 914, and 916 remain unchanged.

Therefore, at time t6, engine status is ON at plot 902 with the vehicle driving through water as indicated by plot 904, and hence the engine is being operated in VDE mode at plot 906. The LIVC control strategy is ON as indicated by plot 908, at time t6, for controlling the compression of active cylinders of the engine. The first and fourth cylinders, at time t6, are deactivated and sealed with negligible power output at plots 910 and 916, respectively. On the other hand, the second and third cylinders of the engine, at time t6, are active and contributing to the total engine power, as indicated by a lower-than-optimum power output at plots 912 and 914, respectively. It should be appreciated that while the illustrated example shows a four-cylinder engine, the methods disclosed herein for mitigating engine water ingestion and/or resulting combustion instabilities may be applied to any variable displacement engine with more than four cylinders.

In this way, methods and systems are provided herein for mitigating water ingestion in a variable displacement engine, thereby reducing combustion instabilities and potential engine damage during water wading conditions. A technical effect of strategically operating the engine in a VDE mode with a reduced number of cylinders of the engine activated and any cylinders in excess of the reduced number of cylinders deactivated at the beginning of the water wading conditions minimizes water ingestion into the cylinders. An advantage of reactivating one or more deactivated dry cylinders to substitute a misfiring cylinder while driving through water wading conditions allows the vehicle to maintain engine power, such that the vehicle is able to move through the water without the engine stalling. A further advantage of the methods disclosed herein is that by adjusting the variable cam timing system in accordance with a LIVC strategy enables controlling the compression cycle of the active cylinders during the water wading conditions, such that any water ingested into the cylinders is not overly compressed, thereby mitigating hydrolock events.

The disclosure also provides support for a method for a vehicle, comprising: with an engine of the vehicle turned on, responsive to detection of a water wading condition through which the vehicle is passing, operating the engine in a variable displacement engine (VDE) mode with a reduced number of cylinders of the engine activated and any cylinders in excess of the reduced number of cylinders deactivated. In a first example of the method, the water wading condition through which the vehicle is passing is detected by a plurality of onboard cameras, a humidity sensor, one or more of tire pressure sensors, and/or a proximity sensor. In a second example of the method, optionally including the first example, the engine is operated in the VDE mode prior to the vehicle entering the water wading condition. In a third example of the method, optionally including one or both of the first and second examples, each deactivated cylinder of the engine is sealed to prevent water ingestion by at least one of disabling a corresponding fuel injector, disabling a corresponding spark ignition, and/or closing a corresponding intake and exhaust valves of the deactivated cylinder. In a fourth example of the method, optionally including one or more or each of the first through third examples, the method further comprises: monitoring a power contributed by each active cylinder of the engine using a power balance test while the vehicle is passing through the water wading condition. In a fifth example of the method, optionally including one or more or each of the first through fourth examples, the method further comprises: identifying a hydrolock event when one or more active cylinders yield a power output higher than a second threshold power based on a result of the power balance test. In a sixth example of the method, optionally including one or more or each of the first through fifth examples, the method further comprises: mitigating the hydrolock event by adjusting a variable cam timing system to retard a timing of intake valve closure to reduce compression of each active cylinder while the vehicle is passing through the water wading condition. In a seventh example of the method, optionally including one or more or each of the first through sixth examples, the method further comprises: identifying a misfire event when one or more active cylinders yield a power output lower than a first threshold power based on a result of the power balance test. In a eighth example of the method, optionally including one or more or each of the first through seventh examples, the method further comprises: mitigating the misfire event by deactivating each misfiring cylinder and simultaneously reactivating one or more deactivated cylinders of the engine while the vehicle is passing through the water wading condition.

The disclosure also provides support for a method for controlling an engine of a vehicle, comprising: while the engine is on and responsive to detection of a water wading condition through which the vehicle begins to pass, deactivating a maximum number of cylinders of the engine, where the maximum number is a highest number of cylinders deactivated while maintaining remaining cylinders active to maintain power; monitoring the power contributed by each active cylinder of the engine while the vehicle is passing through the water wading condition; and responsive to identification of a misfire event in one or more active cylinders of the engine based on monitoring of the power, disabling the one or more active cylinders that are misfiring and simultaneously reactivating one or more deactivated cylinders of the engine. In a first example of the method, the water wading condition through which the vehicle is passing is detected by a plurality of onboard cameras, a humidity sensor, one or more of tire pressure sensors, and/or a proximity sensor. In a second example of the method, optionally including the first example, each deactivated cylinder of the engine is sealed to prevent water ingestion by at least one of disabling a corresponding fuel injector, disabling a corresponding spark ignition, and/or closing a corresponding intake and exhaust valves of the deactivated cylinder. In a third example of the method, optionally including one or both of the first and second examples, closing the corresponding intake and exhaust valves of the deactivated cylinder of the engine is performed by actuating a valve deactivator or via a cam profile switching mechanism where a cam with no lift is utilized. In a fourth example of the method, optionally including one or more or each of the first through third examples, the misfire event in the one or more active cylinders of the engine is identified when the one or more active cylinders of the engine yields a power output lower than a first threshold power. In a fifth example of the method, optionally including one or more or each of the first through fourth examples, the method further comprises: identifying a hydrolock event in response to one or more active cylinders of the engine yielding a power output higher than a second threshold power based on monitoring of the power. In a sixth example of the method, optionally including one or more or each of the first through fifth examples, the method further comprises: mitigating the hydrolock event by adjusting a variable cam timing system to delay a timing of intake valve closure of each active cylinder of the engine while the vehicle is passing through the water wading condition.

The disclosure also provides support for an engine method for a vehicle, comprising: while the engine is on and responsive to detection of a water wading condition through which the vehicle begins to pass, operating the engine in a variable displacement engine mode with a reduced number of cylinders of the engine activated and any cylinders in excess of the reduced number of cylinders deactivated; monitoring power contributed by each active cylinder of the engine while the vehicle is passing through the water wading condition; responsive to one or more active cylinders yielding a power output higher than a second threshold power based on monitoring of the power, retarding a timing of intake valve closure of each active cylinder of the engine; and responsive to one or more active cylinders yielding a power output lower than a first threshold power based on monitoring of the power, disabling the one or more active cylinders yielding the power output lower than the first threshold power and simultaneously reactivating one or more of the deactivated cylinders of the engine. In a first example of the method, a hydrolock event is identified when the one or more active cylinders yield power output higher than the second threshold power, and wherein retarding the timing of intake valve closure of each active cylinder of the engine is performed by adjusting a variable cam timing system to mitigate the hydrolock event. In a second example of the method, optionally including the first example, adjusting the variable cam timing system to retard the timing of intake valve closure of each active cylinder reduces an effective compression ratio. In a third example of the method, optionally including one or both of the first and second examples, a misfire event is identified when the one or more active cylinders yield power output lower than the first threshold power, and wherein reactivating the one or more of the deactivated cylinders of the engine is performed via a cam profile switching mechanism or by deactivating a valve deactivator to mitigate the misfire event.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
while an engine of the vehicle is turned on,
responsive to detecting a water wading condition through which the vehicle is passing, the water wading condition including when a water depth on a flooded road is greater than a threshold depth, operating the engine in a variable displacement engine (VDE) mode with a reduced number of activated cylinders, including deactivating cylinders in excess of the reduced number of activated cylinders, wherein deactivating a cylinder includes sealing the cylinder by closing intake and exhaust valves of the cylinder.

2. The method of claim 1, wherein the water wading condition through which the vehicle is passing is detected by one or more of an onboard camera, a humidity sensor, a tire pressure sensor and a proximity sensor.

3. The method of claim 1, wherein deactivating the cylinder further includes one or more of disabling a fuel injector of the cylinder and disabling a spark ignition of the cylinder.

4. The method of claim 1, further comprising determining a power output by each of the activated cylinders of the engine while the vehicle is passing through the water wading condition, wherein determining the power output at each of the activated cylinders includes, for each of the activated cylinders, while the engine is operating, measuring a change in an engine speed responsive to disabling a spark ignition at an activated cylinder, while maintaining fueling and the spark ignition in all other activated cylinders.

5. The method of claim 4, further comprising identifying a hydrolock event at one of the activated cylinders responsive to the power output of the activated cylinder being higher than a second threshold power.

6. The method of claim 5, further comprising mitigating the hydrolock event, including adjusting a variable cam timing system to retard an intake valve closure timing and to reduce compression at each of the activated cylinders while the vehicle is passing through the water wading condition.

7. The method of claim 4, further comprising, determining one of the activated cylinders as misfiring responsive to the activated cylinder yielding the power output lower than a first threshold power.

8. The method of claim 7, further comprising, deactivating each of the activated cylinders determined as misfiring, and simultaneously reactivating one of the cylinders in excess of the reduced number of activated cylinders that was deactivated in response to determining the water wading condition for each of the activated cylinders determined as misfiring that is deactivated, while the vehicle is passing through the water wading condition.

9. A method for controlling an engine of a vehicle, comprising:
while the engine is on and responsive to detection of a water wading condition through which the vehicle begins to pass, the water wading condition including when a water depth on a flooded road is greater than a threshold depth, deactivating a maximum number of cylinders of the engine, where the maximum number is a highest number of cylinders deactivated while maintaining remaining cylinders active to maintain power, wherein deactivating a cylinder of the engine includes sealing the cylinder by closing intake and exhaust valves of the cylinder to stop combustion at the cylinder;
monitoring the power contributed by each active cylinder of the engine while the vehicle is passing through the water wading condition; and
responsive to identification of a misfire event in one or more active cylinders of the engine based on monitoring of the power, disabling the one or more active cylinders that are misfiring and simultaneously reactivating one or more deactivated cylinders of the engine.

10. The method of claim 9, wherein closing the intake and exhaust valves of the deactivated cylinder of the engine is performed by a cam profile switching mechanism where a cam with no lift is utilized.

11. The method of claim 9, wherein the misfire event in the one or more active cylinders of the engine is identified when the one or more active cylinders of the engine yields a power output lower than a first threshold power.

12. The method of claim 9, further comprising identifying a hydrolock event in response to one or more active cylinders of the engine yielding a power output higher than a second threshold power based on monitoring of the power.

13. The method of claim 12, further comprising mitigating the hydrolock event by adjusting a variable cam timing system to delay a timing of intake valve closure of each active cylinder of the engine while the vehicle is passing through the water wading condition.

14. An engine method for a vehicle, comprising:
while an engine is on and responsive to detection of a water wading condition through which the vehicle begins to pass, the water wading condition including when a water depth on a flooded road is greater than a threshold depth, operating the engine in a variable displacement engine mode with a reduced number of active cylinders, including deactivating any cylinders in excess of the reduced number of active cylinders, wherein deactivating a cylinder includes sealing the cylinder by closing intake and exhaust valves of the cylinder to stop combustion at the cylinder;
monitoring a power contributed by each active cylinder of the engine while the vehicle is passing through the water wading condition;
responsive to one or more active cylinders yielding a power output higher than a second threshold power based on monitoring of the power, retarding an intake valve closure timing of each active cylinder of the engine; and
responsive to one or more active cylinders yielding a power output lower than a first threshold power based on monitoring of the power, deactivating the one or more active cylinders yielding the power output lower than the first threshold power and simultaneously reactivating one of the cylinders in excess of the reduced number of active cylinders of the engine deactivated responsive to detection of the water wading condition for each of the active cylinders deactivated responsive to yielding the power output lower than the first threshold power.

15. The method of claim 14, further comprising, identifying a hydrolock event responsive to the one or more active cylinders yielding the power output higher than the second threshold power, the second threshold power greater than the first threshold power, and wherein retarding the timing of intake valve closure timing of each active cylinder of the engine is performed by adjusting a variable cam timing system to mitigate the hydrolock event.

16. The method of claim 15, wherein adjusting the variable cam timing system to retard the intake valve closure timing of each active cylinder reduces an effective compression ratio of the engine.

17. The method of claim 14, further comprising, identifying a misfire event responsive to the one or more active cylinders yielding the power output lower than the first threshold power, wherein reactivating one of the cylinders in excess of the reduced number of active cylinders of the engine deactivated responsive to detection of the water wading condition includes opening the intake and exhaust valves of the cylinder with a cam profile switching mechanism to mitigate the misfire event.

18. The method of claim 1, further comprising, responsive to determining misfiring in an activated cylinder during the water wading condition, deactivating the activated cylinder and reactivating one of the cylinders in excess of the reduced number of activated cylinders deactivated responsive to detecting the water wading condition, including opening the intake and exhaust valves of the cylinder and resuming combustion at the cylinder.

19. The method of claim 2, further comprising detecting the water wading condition, including measuring a first tire pressure and a second tire pressure with a tire pressure sensor, the second tire pressure measured after measuring the first tire pressure, wherein the water wading condition is detected responsive to the first tire pressure being different than the second tire pressure.

20. The method of claim 2, further comprising detecting the water wading condition, including measuring a distance from a water surface to the vehicle with an ultrasonic sensor positioned at a front end or a back end of the vehicle, measuring a distance from a dry ground surface to the vehicle with the ultrasonic sensor, and calculating the water depth based on a difference between the distance from the water surface to the vehicle and the distance from the dry ground surface to the vehicle.

* * * * *